(12) United States Patent
Kanai

(10) Patent No.: US 7,242,522 B2
(45) Date of Patent: Jul. 10, 2007

(54) BINOCULAR MAGNIFYING GLASSES

(75) Inventor: Moriyasu Kanai, Saitama-ken (JP)

(73) Assignee: PENTAX Corporation, Tokyo (JP)

( * ) Notice: Subject to any disclaimer, the term of this patent is extended or adjusted under 35 U.S.C. 154(b) by 43 days.

(21) Appl. No.: 10/806,393

(22) Filed: Mar. 23, 2004

(65) Prior Publication Data
US 2004/0190136 A1    Sep. 30, 2004

(30) Foreign Application Priority Data
Mar. 24, 2003 (JP) ............................ 2003-081374
Jul. 25, 2003 (JP) ............................ 2003-201556

(51) Int. Cl.
*G02B 23/00* (2006.01)

(52) U.S. Cl. ................ 359/415; 359/407; 359/412; 359/413

(58) Field of Classification Search ................ 359/407, 359/412, 413, 415, 399, 362
See application file for complete search history.

(56) References Cited

U.S. PATENT DOCUMENTS

| 4,795,235 A | 1/1989 | Spitzberg | |
|---|---|---|---|
| 5,028,127 A | 7/1991 | Spitzberg | |
| 5,499,066 A * | 3/1996 | Farmer et al. | 351/221 |
| 5,966,239 A | 10/1999 | Shirayanagi et al. | |
| 6,204,966 B1 * | 3/2001 | Steinhuber | 359/407 |
| 6,282,021 B1 * | 8/2001 | Yano | 359/415 |

FOREIGN PATENT DOCUMENTS

| JP | 07-199083 | 8/1995 |
|---|---|---|
| JP | 09-262210 | 10/1997 |

* cited by examiner

*Primary Examiner*—Stephone B. Allen
*Assistant Examiner*—Joshua L. Pritchett
(74) *Attorney, Agent, or Firm*—Greenblum & Bernstein, P.L.C.

(57) ABSTRACT

An adjustment method includes rotating a pair of magnifying glasses in directions opposite to each other using γ-rotation, and correcting inclination of an image, caused by the γ-rotation, by rotating the pair of magnifying glasses in directions opposite to each other using the β-rotation, given that rotation about each of axes $X_L$ and $X_R$, which respectively correspond to visual axes of left and right eyes when an object distance is infinite in a condition of a primary position, is represented by the γ-rotation, and that rotation about each of axis $Y_L$ and $Y_R$, which are respectively perpendicular to the axes $X_L$ and $X_R$ and are also perpendicular to a z-axis which perpendicularly intersects with the axis $X_L$ at a position of a deflector for the left eye and the axis $X_R$ at a position of the deflector for the right eye, is represented by the β-rotation.

18 Claims, 13 Drawing Sheets

BINOCULAR MAGNIFYING GLASSES

BACKGROUND OF THE INVENTION

The present invention relates to binocular magnifying glasses which are worn for examining an object in a magnified manner when performing precision work by hand, etc.

In conventional binocular magnifying glasses of this type, there has been known the technology disclosed in Japanese Patent Provisional Publication No. HEI 7-199083. The binocular magnifying glasses have a pair of magnifying optical systems, each system being provided for each of the right and left eyes. Each magnifying optical system includes an objective lens having a positive power and an eyepiece having a negative power arranged in that order from an object side to an eye side. Optical centers of the objective lens and the eyepiece of each magnifying optical system are positioned outside a line connecting the center of rotation of the eye and the object point as shown in FIG. 1 of the publication.

With this configuration, the binocular magnifying glasses providing a balance between accommodation and convergence of the eyes can be attained. However, there is a problem that the wearer is required to lean his or her head by an angle raging from 30° to 60° with respect to a horizontal direction because an optical path of each of the magnifying optical systems for the right and left eyes is a straight line. Therefore, the wearer is not able to withstand long-term use of the binocular magnifying glasses.

When the optical path in each of the magnifying optical systems for the right and left eyes is bent by an angle range of 30° through 60° so as to reduce the burden on the wearer, an additional problem occurs. That is, when the optical axis of each of the magnifying optical systems is bent, if the magnifying optical system is tilted to adjust the convergence of the eyes, right and left images rotate in directions opposite to each other. In such a case, even if the adjustment of convergence is accomplished, the right and left images do not match with each other.

SUMMARY OF THE INVENTION

The present invention is advantageous in that it provides binocular magnifying glasses which are capable of matching a right image to a left image when an adjustment of convergence is accomplished while reducing a burden on a wearer by deflecting an optical path in each of optical systems for right and left eyes.

According to an aspect of the invention, there is provided an adjustment method for binocular magnifying glasses having a pair of magnifying glasses for right and left eyes, each of the pair of magnifying glasses having a magnifying optical system and a deflector deflecting an optical path of the magnifying optical system. The adjustment method includes rotating the pair of magnifying glasses in directions opposite to each other using γ-rotation, and correcting inclination of an image, caused by the γ-rotation, by rotating the pair of magnifying glasses in directions opposite to each other using the β-rotation, given that rotation about each of axes $X_L$ and $X_R$, which respectively correspond to visual axes of left and right eyes when an object distance is infinite in a condition of a primary position, is represented by the γ-rotation, and that rotation about each of axis $Y_L$ and $Y_R$, which are respectively perpendicular to the axes $X_L$ and $X_R$ and are also perpendicular to a z-axis which perpendicularly intersects with the axis $X_L$ at a position of the deflector for the left eye and the axis $X^R$ at a position of the deflector for the right eye, is represented by the β-rotation.

With this configuration, it becomes possible to perform an adjustment of convergence keeping a condition in which an inclination of an image is corrected. Therefore, a right image and a left image can be matched to each other when the adjustment of convergence is accomplished while reducing a burden on a wearer by deflecting an optical path in each of optical systems for right and left eyes.

Optionally, when an angle of the γ-rotation for each of the right and left eyes is represented by γ°, and an angle of the β-rotation for each of the right and left eyes is represented by β°, the adjustment method may satisfy a condition:

$$-0.50° < \epsilon(\gamma) + \epsilon(\beta) < 0.50° \tag{1}$$

where $\epsilon(\gamma) = \gamma - \cos^{-1}\{1 - \sin^2(90-\theta) \times (1 - \cos \gamma)\}$, $\epsilon(\beta) = \cos^{-1}\{1 - \sin^2 \theta \times (1 - \cos \beta)\}$, and θ is a deflection angle (unit: degree) that the deflector deflects the optical path, except in a case where $\epsilon(\gamma) = \epsilon(\beta) = 0$.

Alternatively, the adjustment method may satisfy a condition:

$$-0.33° < \epsilon(\gamma) + \epsilon(\beta) < 0.33° \tag{2}$$

where $\epsilon(\gamma) = \gamma - \cos^{-1}\{1 - \sin^2(90-\theta) \times (1 - \cos \gamma)\}$, $\epsilon(\beta) = \cos^{-1}\{1 - \sin^2 \theta \times (1 - \cos \beta)\}$, and θ is a deflection angle (unit: degree) that the deflector deflects the optical path, except in a case where $\epsilon(\gamma) = \epsilon(\beta) = 0$.

Optionally, the adjustment method may satisfy a condition:

$$28.8 \text{ mm} < Z\gamma + Z\beta + \Delta P/2 < 35.2 \text{ mm} \tag{3}$$

where $Z\gamma = WD \times \sin \theta \times \tan \gamma$, $Z\beta = WD \times \cos \theta \times \tan(\beta - \beta/m)$, $\Delta P = 2\{WD \times \cos \theta \times \tan(\beta(Z)/m) + 25 \times \tan \beta(Z)\}$, WD represents an object distance (mm), m represents an magnification of each magnifying glass, and β(Z) represents ½ of an angle of convergence.

According to another aspect of the invention, there is provided binocular magnifying glasses, which is provided with a pair of magnifying glasses for right and left eyes, each of the pair of magnifying glasses including a magnifying optical system, and a deflector that deflects an optical path of the magnifying optical system. In this structure, an adjustment of the binocular magnifying glasses has been performed in accordance with: rotating the pair of magnifying glasses in directions opposite to each other using γ-rotation; and correcting inclination of an image, caused by the γ-rotation, by rotating the pair of magnifying glasses in directions opposite to each other using the β-rotation.

With this configuration, it becomes possible to perform an adjustment of convergence keeping a condition in which an inclination of an image is corrected. Therefore, a right image and a left image can be matched to each other when the adjustment of convergence is accomplished while reducing a burden on a wearer by deflecting an optical path in each of optical systems for right and left eyes.

Optionally, the adjustment may be performed to satisfy a condition:

$$-0.50° < \epsilon(\gamma) + \epsilon(\beta) < 0.50° \tag{1}$$

where $\epsilon(\gamma) = \gamma - \cos^{-1}\{1 - \sin^2(90-\theta) \times (1 - \cos \gamma)\}$, $\epsilon(\beta) = \cos^{-1}\{1 - \sin^2 \theta \times (1 - \cos \beta)\}$, and θ is a deflection angle (unit: degree) that the deflector deflects the optical path, except in a case where $\epsilon(\gamma) = \epsilon(\beta) = 0$.

Alternatively, the adjustment may be performed to satisfy a condition:

$$-0.33° < \epsilon(\gamma) + \epsilon(\beta) < 0.33° \quad (2)$$

where $\epsilon(\gamma) = \gamma - \cos^{-1}\{1 - \sin^2(90-\theta) \times (1 - \cos \gamma)\}$, $\epsilon(\beta) = \cos^{-1}\{1 - \sin^2 \theta \times (1 - \cos \beta)\}$, and $\theta$ is a deflection angle (unit: degree) that the deflector deflects the optical path, except in a case where $\epsilon(\gamma) = \epsilon(\beta) = 0$.

Optionally, the adjustment may be performed to satisfy a condition:

$$28.8 \text{ mm} < Z\gamma + Z\beta + \Delta P/2 < 35.2 \text{ mm} \quad (3)$$

where $Z\gamma = \text{WD} \times \sin \theta \times \tan \gamma$, $Z\beta = \text{WD} \times \cos \theta \times \tan(\beta - \beta/m)$, $\Delta P = 2\{\text{WD} \times \cos \theta \times \tan(\beta(Z)/m) + 25 \times \tan \beta(Z)\}$, WD represents an object distance (mm), m represents an magnification of each magnifying glass, and $\beta(Z)$ represents ½ of an angle of convergence.

According to another aspect of the invention, there is provided binocular magnifying glasses, which is provided with a pair of magnifying glasses for right and left eyes, each of the pair of magnifying glasses including a magnifying optical system that has an objective lens with a positive power and an eyepiece with a positive power, and a deflector that deflects an optical path of the magnifying optical system, the deflector located between the objective lens and the eyepiece.

In this structure, the deflector includes a first, second, third and fourth reflective surfaces, light incident on the deflector from the objective lens being reflected by the first, second, third and fourth reflective surfaces in order of the first, second, third and fourth reflective surfaces to direct the incident light to the eyepiece and to make an erect image. When an angle, formed between an intersection line of the second and third reflective surfaces and a plane with which an intersection line of the first and fourth reflective surfaces perpendicularly intersects, is represented by an angle $\psi$ which does not take a value of zero, and when rotation about each of axes $X_L$ and $X_R$, which respectively correspond to visual axes of left and right eyes when an object distance is infinite in a condition of a primary position, is represented by the $\gamma$-rotation, and rotation about each of axis $Y_L$ and $Y_R$, which are respectively perpendicular to the axes $X_L$ and $X_R$ and are also perpendicular to a z-axis which perpendicularly intersects with the axis $X_L$ at a position of the deflector for the left eye and the axis $X_R$ at a position of the deflector for the right eye, is represented by the $\beta$-rotation, if an angle of the $\gamma$-rotation and an angle of the $\beta$-rotation are respectively represented by $\gamma(°)$ and $\beta(°)$ with respect to a condition in which optical axes of the objective lenses for the right and left eyes are parallel with each other, the binocular magnifying glasses satisfies a condition:

$$-0.50° < 2\psi - \{\epsilon(\gamma) + \epsilon(\beta)\} < 0.5° \quad (4)$$

where $\epsilon(\gamma) = \gamma - \cos^{-1}\{1 - \sin^2(90-\theta) \times (1 - \cos \gamma)\}$, $\epsilon(\beta) = \cos^{-1}\{1 - \sin^2 \theta \times (1 - \cos \beta)\}$, and $\theta$ represents a deflection angle (unit: degree) that the deflector deflects the optical path.

With this configuration, it is possible to match optical axes to visual axes using the $\beta$-rotation and to adjust convergence using the $\gamma$-rotation. Further, inclination of the image cased by the $\beta$-rotation and the $\gamma$-rotation can be corrected by the adjustment of the angle $\psi$. Therefore, it becomes possible to adjust convergence keeping a condition in which inclination of the image is not caused while deterioration of the image is prevented.

Optionally, the angle $\beta$ of the $\beta$-rotation may satisfy a condition:

$$0.9 \times |\xi| - 0.3 < 31.3 \times \tan \beta| < 1.3 \times |\xi| + 1 \quad (5)$$

where $\xi$ represents diopter (D) of the magnifying optical system.

Still optionally, the deflector may have a first deflecting part in which the first and forth reflective surfaces are integrally provided, and a second deflecting part in which the second and third reflective surfaces are integrally provided. In this case, the angle $\psi$ is formed by rotating the first deflecting part relative to the second deflecting part.

Still optionally, the first, second, third and fourth reflective surfaces may be mirrors, respectively.

Still optionally, the deflector may include a prism having inner surfaces respectively functioning as the first, second, third and fourth reflective surfaces.

Still optionally, the prism may be configured to be a roof prism whose roof surface is formed by the second and third reflective surfaces.

According to another aspect of the invention, there is provided an adjustment method for binocular magnifying glasses having a pair of magnifying glasses for right and left eyes, each of the pair of magnifying glasses having a magnifying optical system and a deflector deflecting an optical path of the magnifying optical system, the magnifying optical system including an objective lens with a positive power and an eyepiece with a positive power, the deflector being located between the objective lens and the eyepiece.

In this structure, the deflector includes a first, second, third and fourth reflective surfaces, light incident on the deflector from the objective lens being reflected by the first, second, third and fourth reflective surfaces in order of the first, second, third and fourth reflective surfaces to direct the incident light to the eyepiece and to make an erect image. The adjustment method includes rotating the pair of magnifying glasses in directions opposite to each other using the $\beta$-rotation to match optical axes thereof to visual axes of the eyes; rotating the pair of magnifying glasses in directions opposite to each other using $\gamma$-rotation to adjust convergence; and correcting inclination of an image by determining the angle $\psi$. Further, the adjustment method satisfies a condition:

$$-0.5° < 2 - \psi\{\epsilon(\gamma) + \epsilon(\beta)\} < 0.5° \quad (4)$$

where $\epsilon(\gamma) = \gamma - \cos^{-1}\{1 - \sin^2(90-\theta) \times (1 - \cos \gamma)\}$, $\epsilon(\beta) = \cos^{-1}\{1 - \sin^2 \theta \times (1 - \cos \gamma)\}$, and $\theta$ represents a deflection angle (unit: degree) that the deflector deflects the optical path.

With this configuration, it is possible to match optical axes to visual axes using the $\beta$-rotation and to adjust convergence using the $\gamma$-rotation. Further, inclination of the image cased by the $\beta$-rotation and the $\gamma$-rotation can be corrected by the adjustment of the angle $\psi$. Therefore, it becomes possible to adjust convergence keeping a condition in which inclination of the image is not caused while deterioration of the image is prevented.

Optionally, the angle $\beta$ of the $\beta$-rotation may satisfy a condition:

$$0.9 \times |\xi| - 0.3 < 31.3 \times \tan \beta| < 1.3 \times |\xi| + 1 \quad (5)$$

where $\xi$ represents diopter (D) of the magnifying optical system.

Still optionally, the deflector may have a first deflecting part in which the first and forth reflective surfaces are integrally provided, and a second deflecting part in which the second and third reflective surfaces are integrally provided. In this case, the angle $\psi$ is formed by rotating the first deflecting part relative to the second deflecting part before the first and second deflecting parts are cemented to each other.

Still optionally, the first, second, third and fourth reflective surfaces may be mirrors, respectively.

Still optionally, the deflector may include a prism having inner surfaces respectively functioning as the first, second, third and fourth reflective surfaces.

Still optionally, the prism may be configured to be a roof prism whose roof surface is formed by the second and third reflective surfaces.

According to another aspect of the invention, there is provided a prism used for binocular magnifying glasses, including a first, second, third and fourth reflective surfaces, an intersection line of the second and third reflective surfaces forming an angle $\psi$, which does not take a value of zero, with respect to a plane with which an intersection line of the first and fourth reflective surfaces perpendicularly intersects.

With this configuration, the prism can attain the function of deflecting the optical axis in each magnifying glass, rotating the image by 180°, and correcting the inclination of the image during the adjustment of convergence.

BRIEF DESCRIPTION OF THE ACCOMPANYING DRAWINGS

Figure 6:
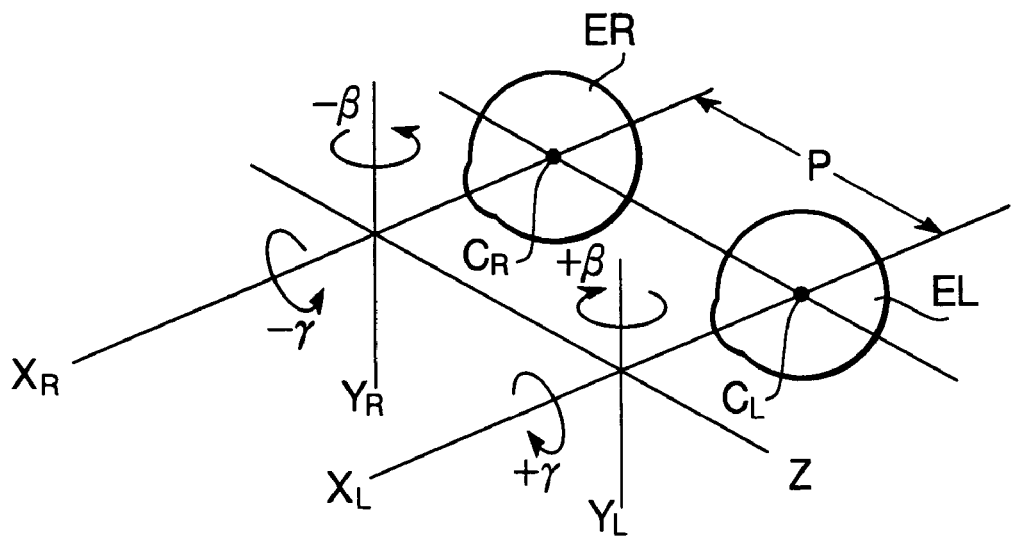
Figure 7:
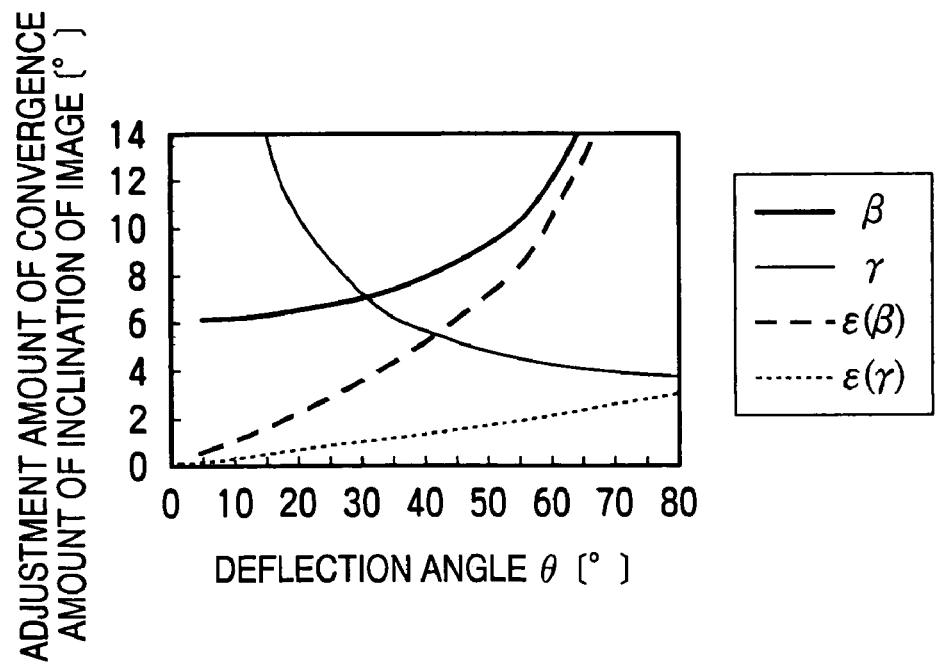
Figure 8:
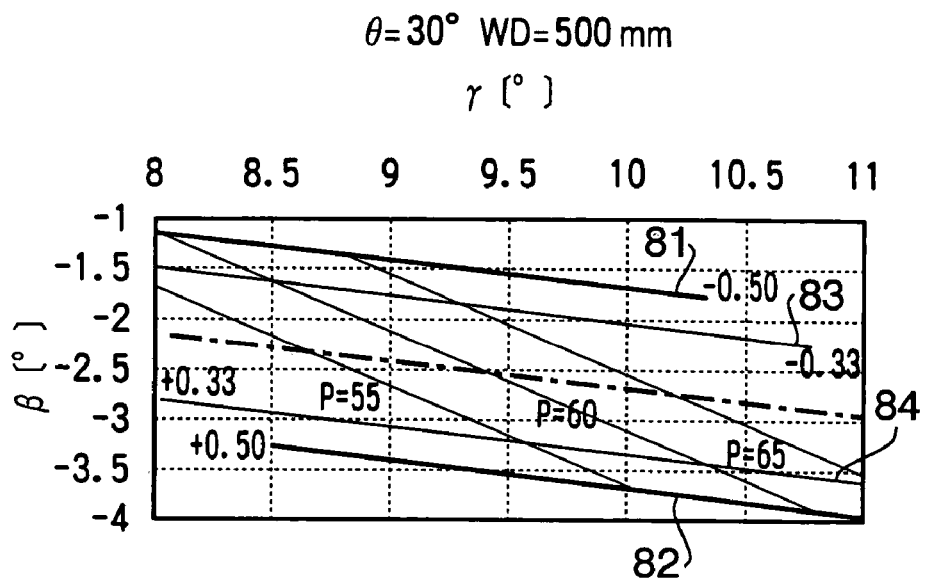
Figure 9:
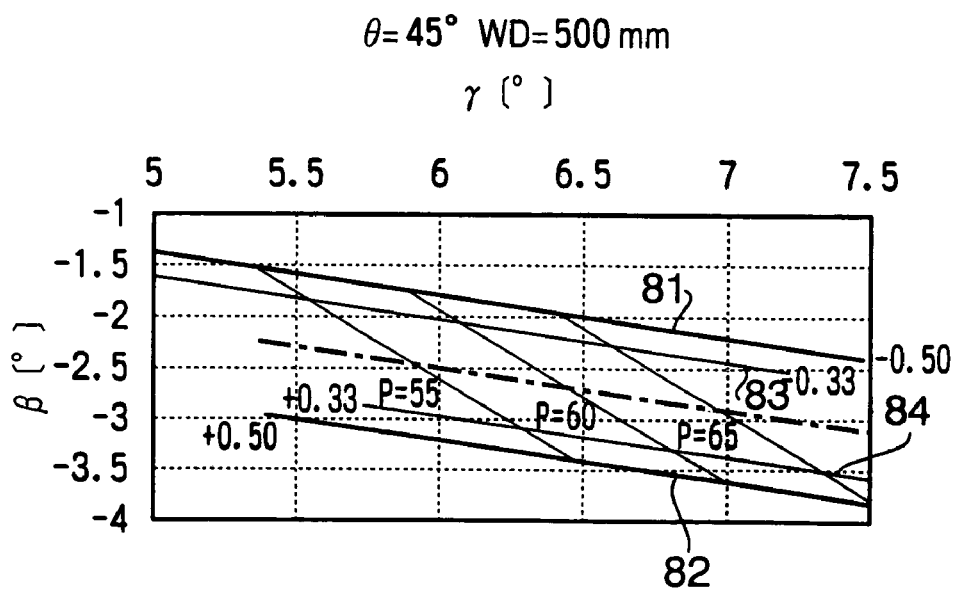
Figure 10:
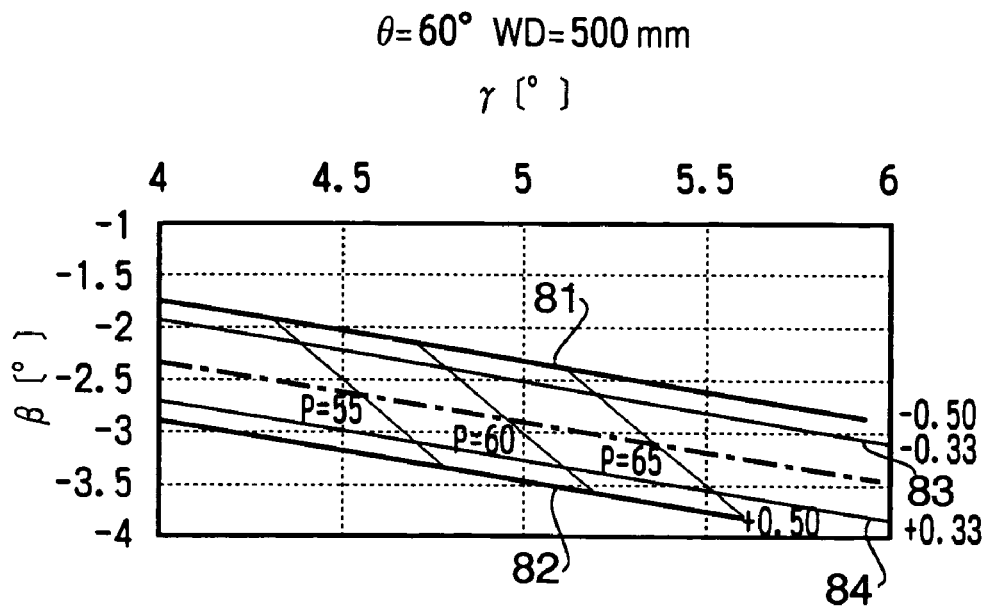
Figure 11:
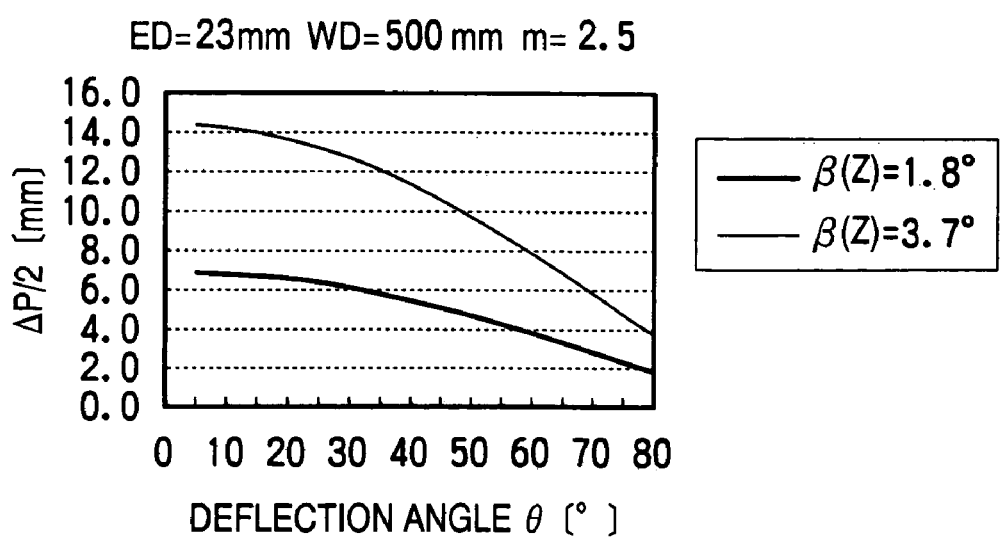
Figure 12:
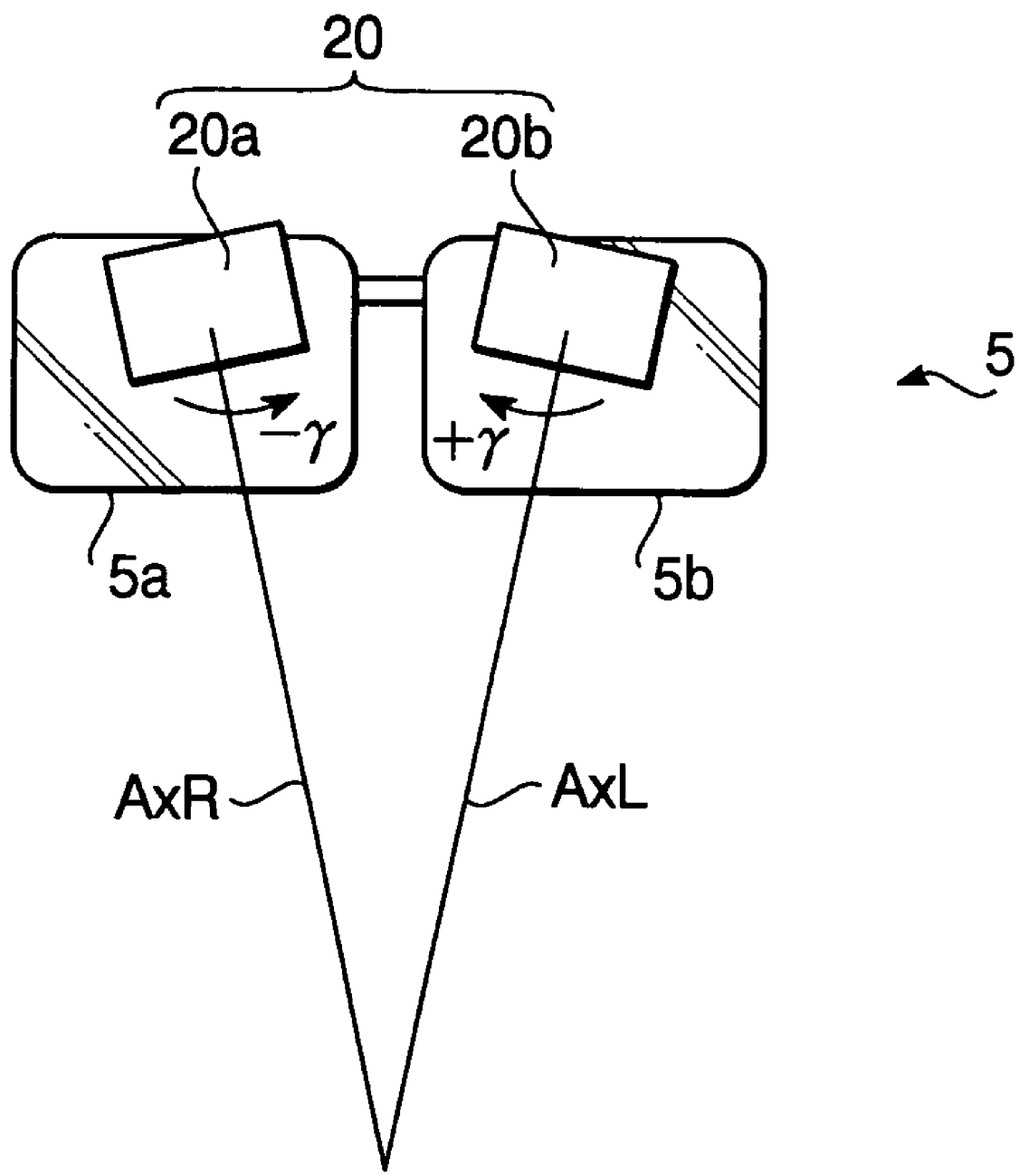
Figure 13:
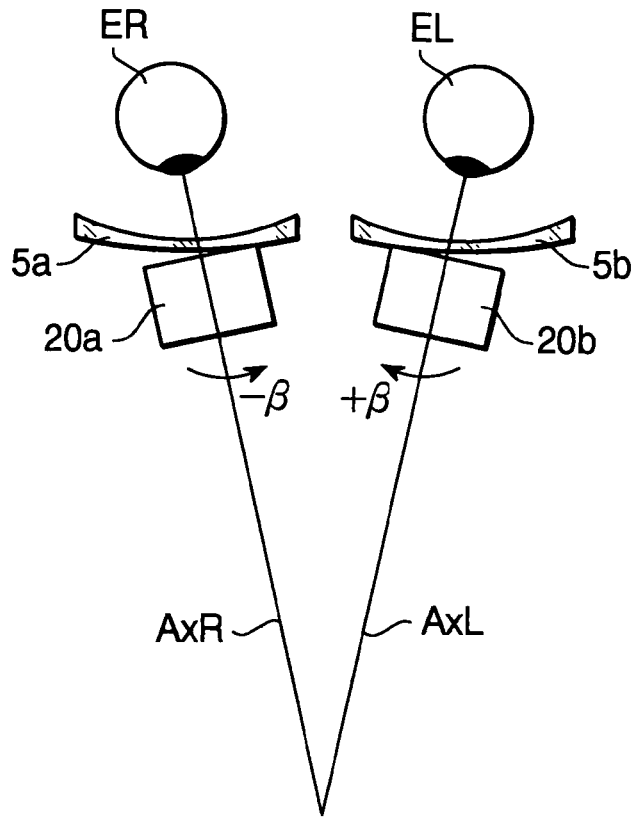
Figure 14:
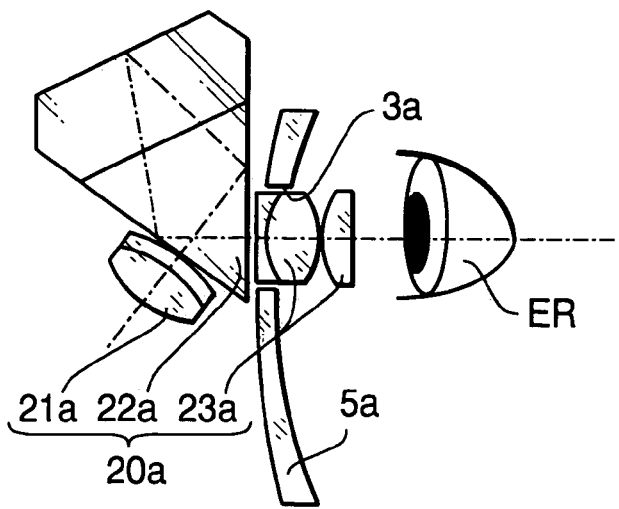
Figure 15:
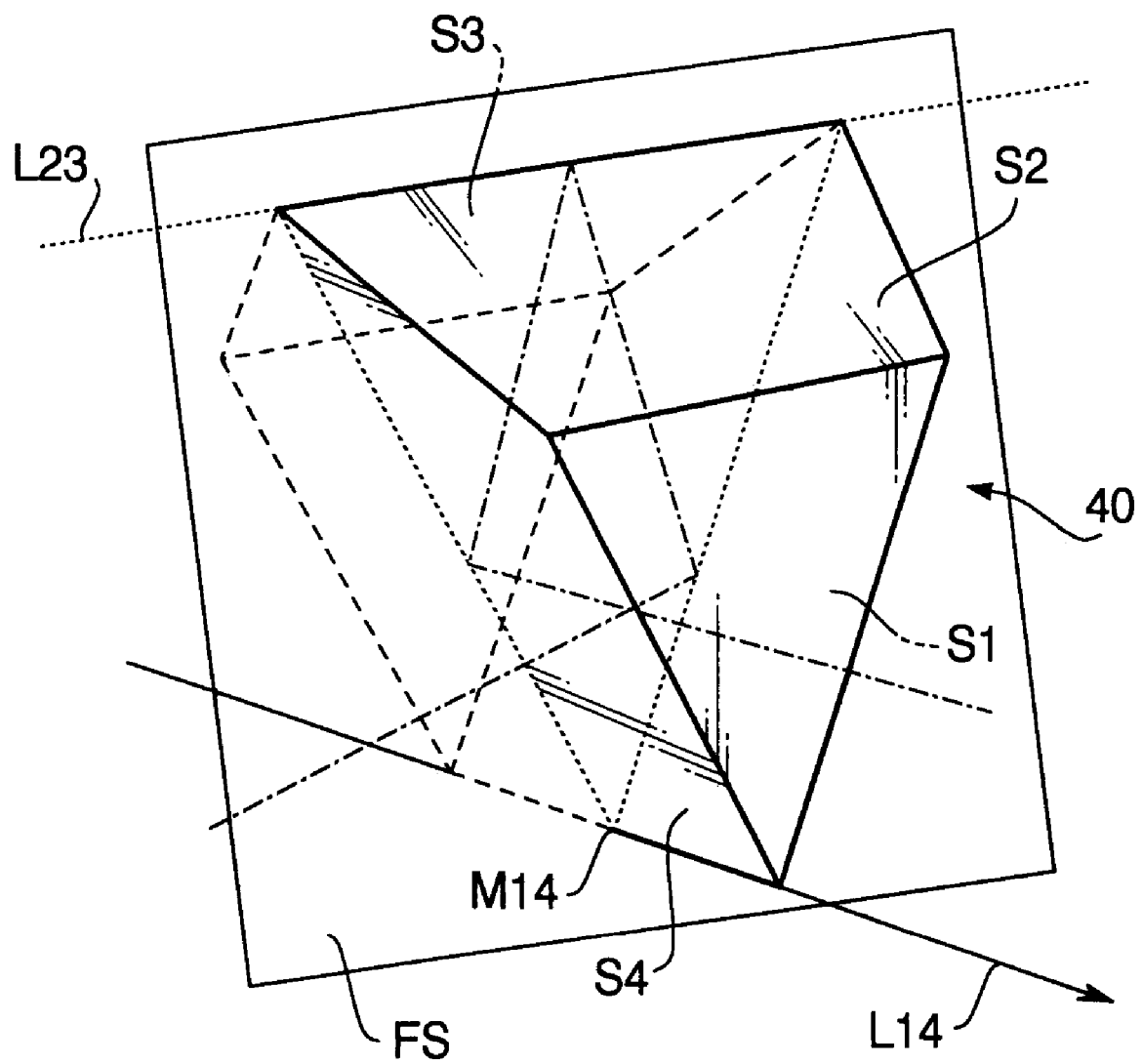
Figure 16:
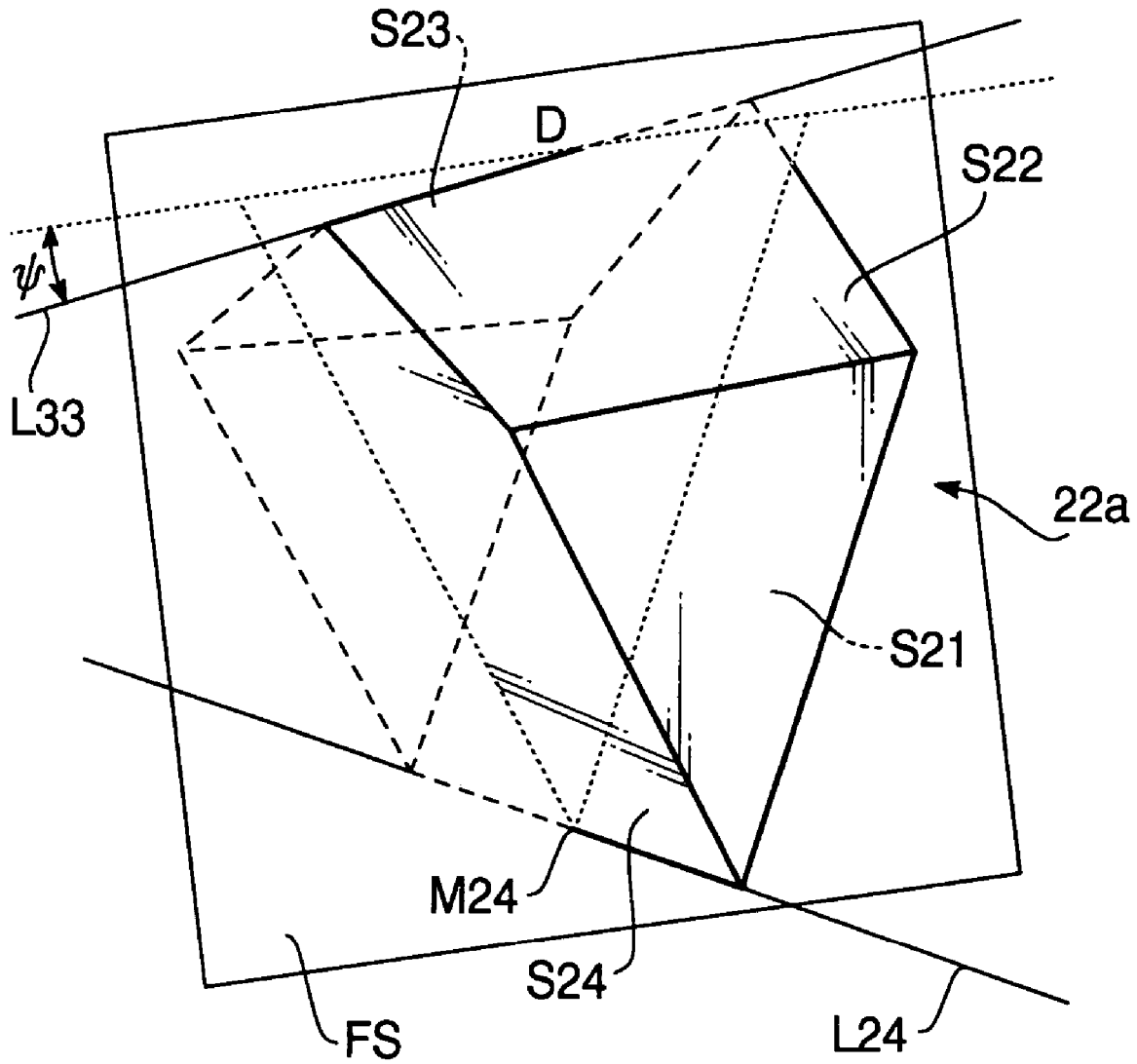
Figure 17:
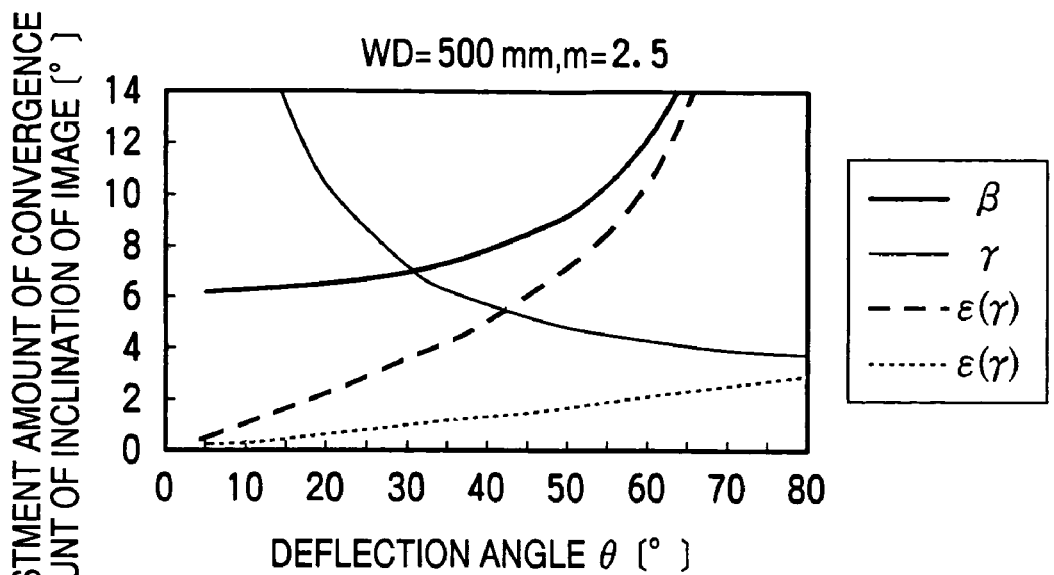
Figure 18:
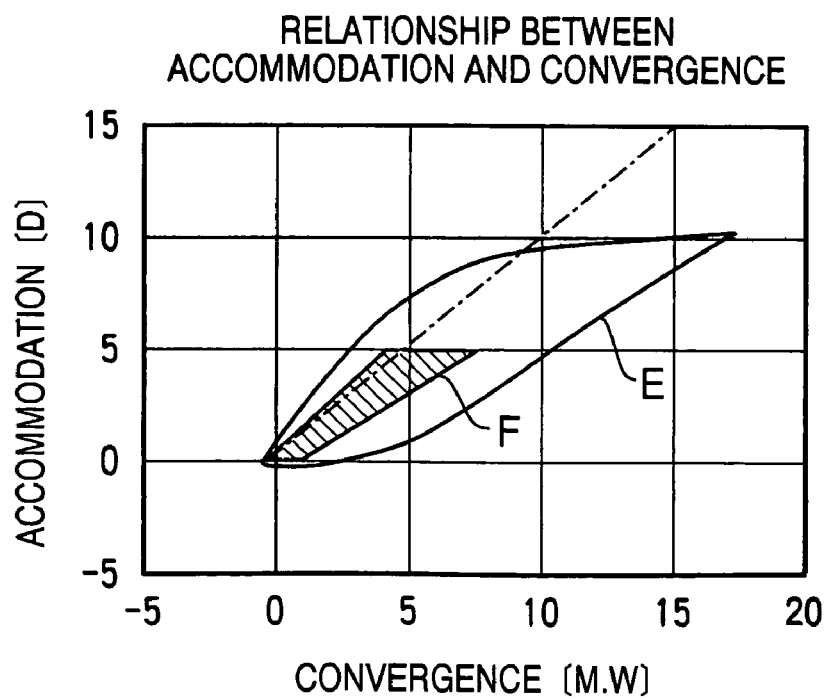
Figure 19:
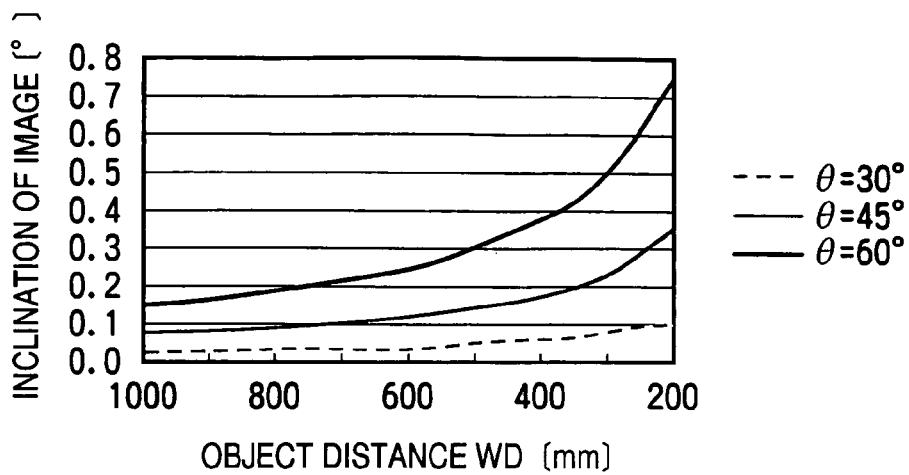
Figure 20:
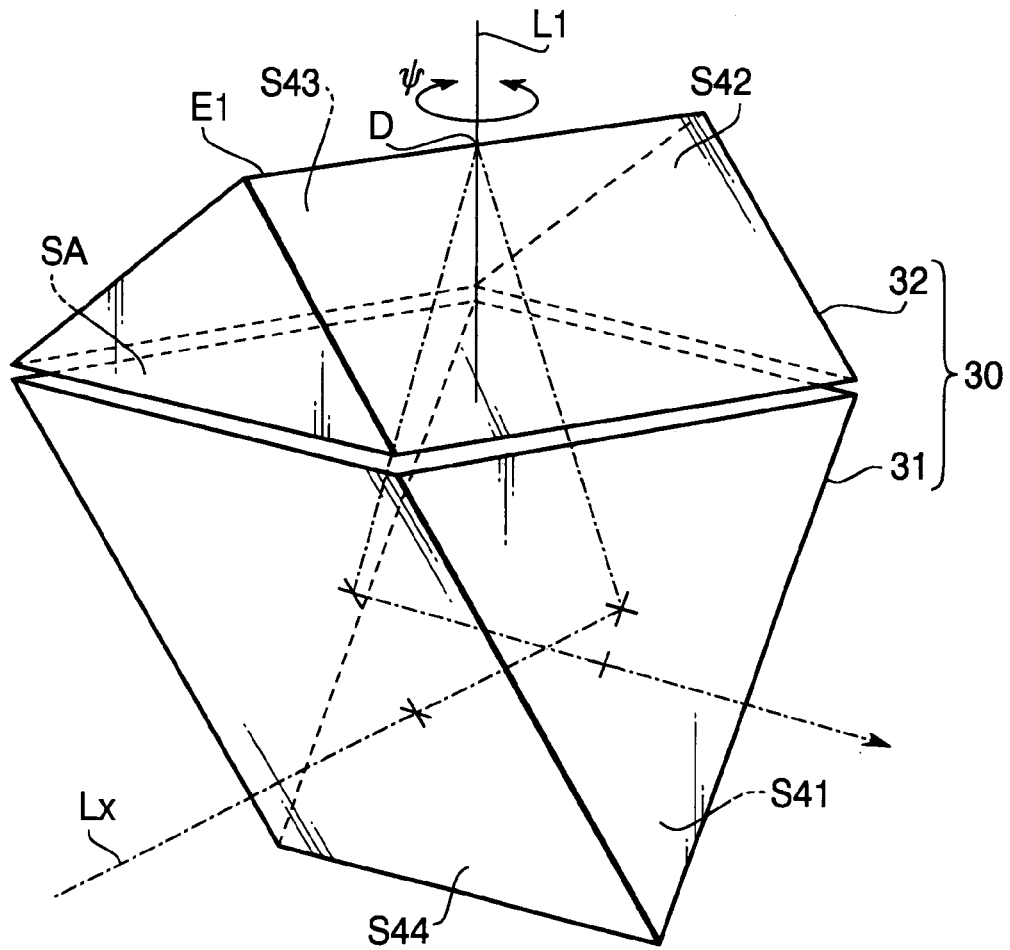
Figure 21:
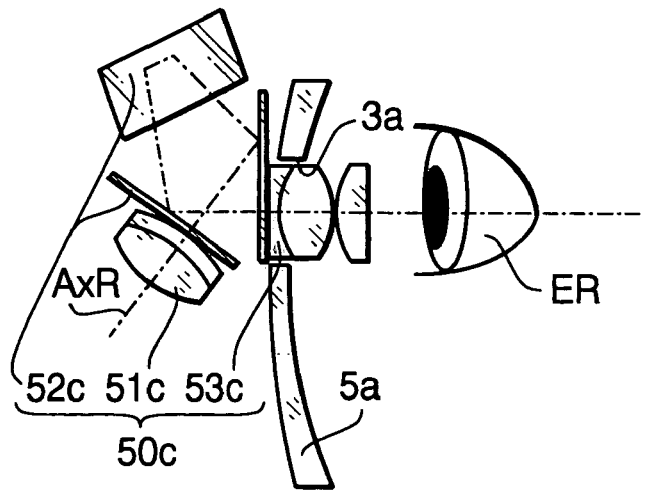
Figure 22:
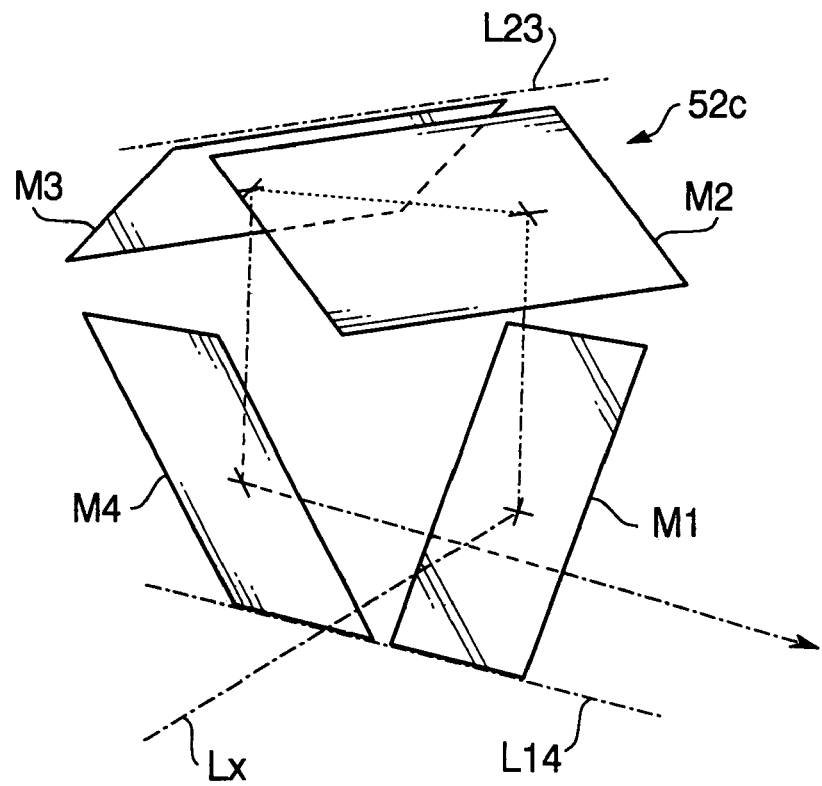

FIG. 6 schematically shows definitions of adjustment axes used for explaining an adjustment method according to the first embodiment of the invention;

FIG. 7 is a graph showing an amount of inclination of a image with respect to a deflection angle $\theta$ when an adjustment of convergence is accomplished;

FIG. 8 is a graph showing an appropriate range of the adjustment with regard to an angle $\gamma$ of $\gamma$-rotation and an angle $\beta$ of $\beta$-rotation when a magnification m=2.5, an object distance WD=500 mm, and the deflection angle $\theta$=30°;

FIG. 9 is a graph showing an appropriate range of the adjustment with regard to the angle $\gamma$ of the $\gamma$-rotation and the angle $\beta$ of the $\beta$-rotation when the magnification m=2.5, the object distance WD=500 mm, and the deflection angle $\theta$=45°;

FIG. 10 is a graph showing an appropriate range of the adjustment with regard to the angle $\gamma$ of the $\gamma$-rotation and the angle $\beta$ of the $\beta$-rotation when the magnification m=2.5, the object distance WD=500 mm, and the deflection angle $\theta$=60°;

FIG. 11 is a graph showing change of half of a correction value $\Delta P$ with respect to the deflection angle $\theta$, assuming that the magnification m=2.5 and the object distance WD=500 mm;

FIG. 12 is a front view of binocular magnifying glasses according to a second embodiment of the invention;

FIG. 13 is a top view of the binocular magnifying glasses shown in FIG. 12;

FIG. 14 is a side view of the binocular magnifying glasses of FIG. 12 showing a configuration of a magnifying glass for the right eye;

FIG. 15 shows a conventional roof prism which is now in widespread use in binoculars;

FIG. 16 shows a configuration of a roof prism according to the second embodiment of the invention;

FIG. 17 is a graph showing the amount of inclination of the image with respect to the deflection angle when the adjustment of convergence is accomplished;

FIG. 18 is a graph showing a relationship of accommodation and convergence;

FIG. 19 is a graph showing the amount of inclination of the image caused the $\gamma$-rotation when the amount of the adjustment of interpupillary distance is 6 mm;

FIG. 20 shows another example of a deflector according to the second embodiment of the invention;

FIG. 21 shows a configuration of a magnifying glass according to a third embodiment of the invention; and FIG. 22 shows a configuration of a mirror group in the magnifying glass shown in FIG. 21.

DETAILED DESCRIPTION OF THE EMBODIMENTS

Hereinafter, embodiments according to the invention are described with reference to the accompanying drawings.

First Embodiment

Figure 1:
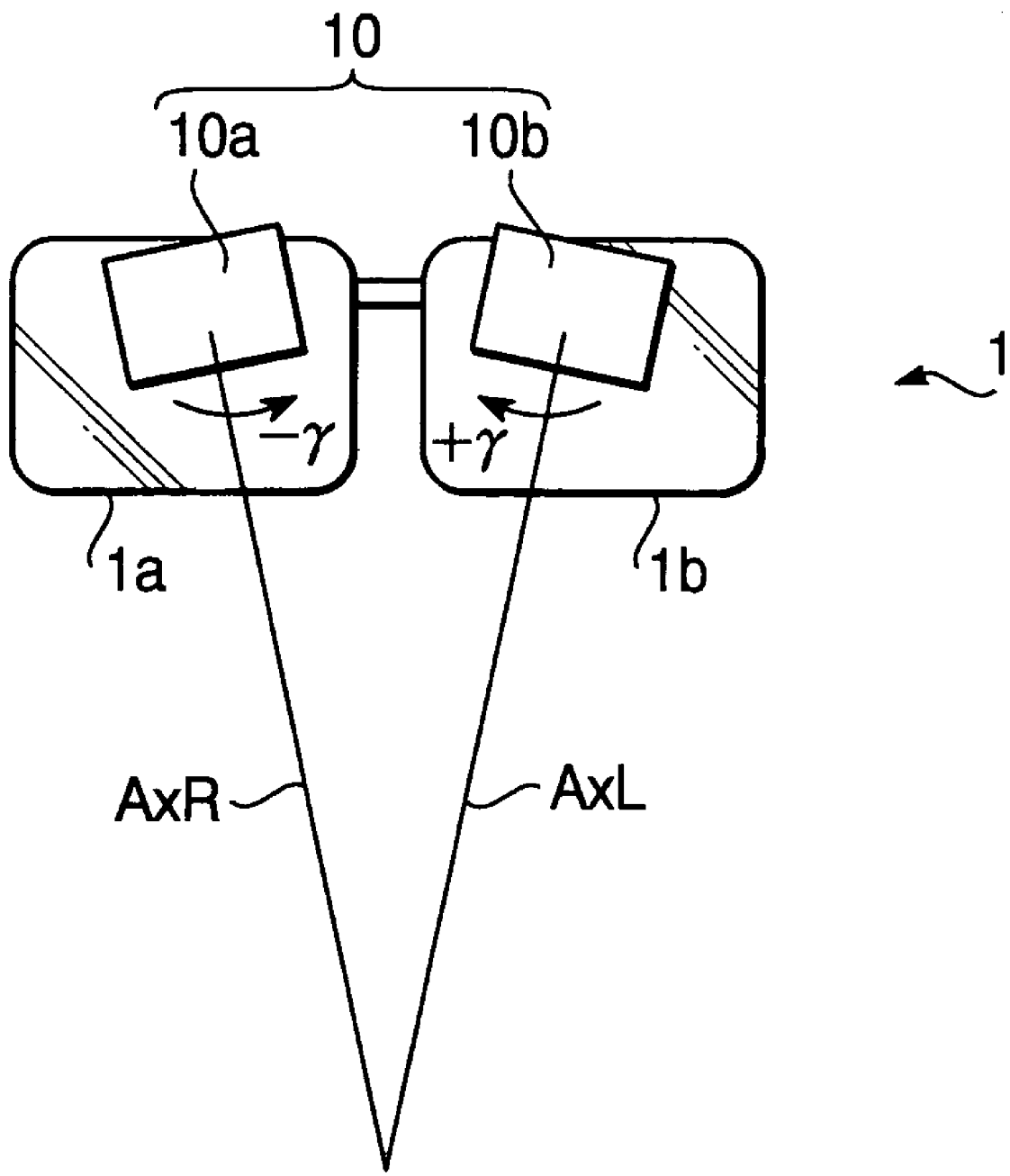
FIG. 1 is a front view of binocular magnifying glasses according to a first embodiment of the invention.
Figure 2:
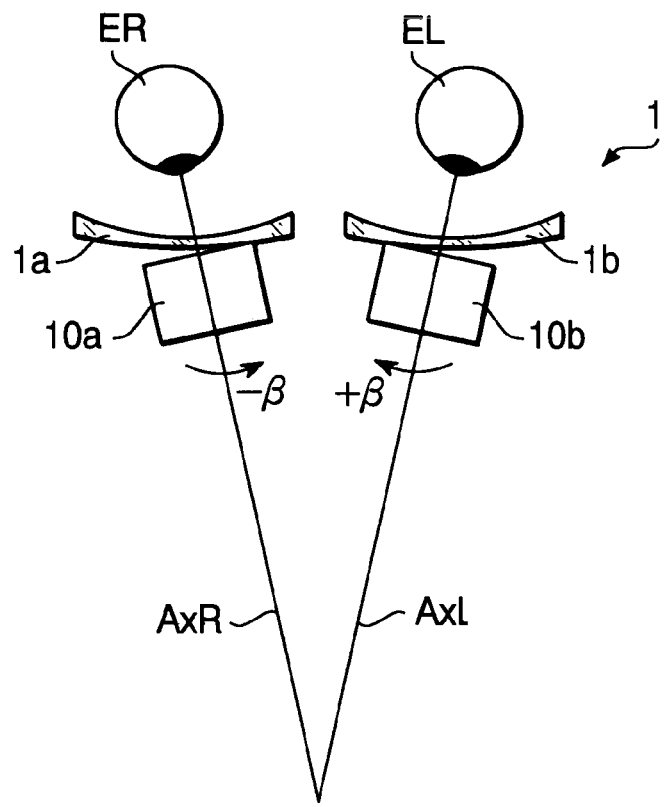
FIG. 2 is a top view of the binocular magnifying glasses shown in FIG. 1.
Figure 3:
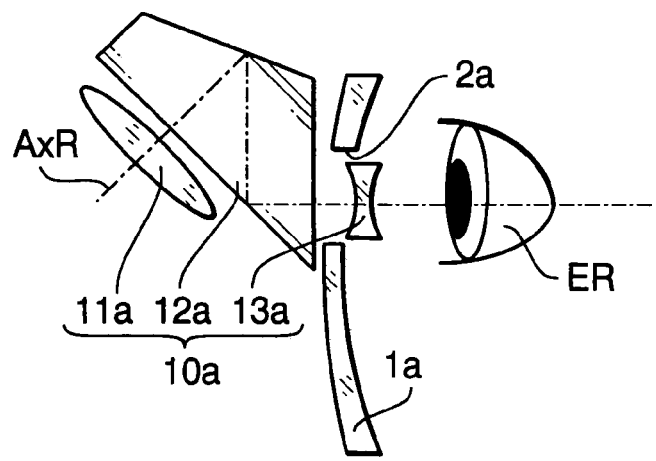
FIG. 3 is a side view of the binocular magnifying glasses of FIG. 1 showing a configuration of a magnifying glass for the right eye.

FIGS. 1–3 show a configuration of binocular magnifying glasses 10 to which an adjustment method according to a first embodiment of the invention is applied. FIG. 1 is a front view of the binocular magnifying glasses 10. FIG. 2 is a top view of the binocular magnifying glasses 10. FIG. 3 is a side view of the binocular magnifying glasses 10 showing a configuration of a magnifying glass 10a for the right eye (ER).

As shown in FIGS. 1 and 2, the binocular magnifying glasses 10 have the magnifying glass 10a for the right eye (ER) attached to a lens 1a of eyeglasses 1, and a magnifying glass 10b for the left eye (EL) attached to a lens 1b of the eyeglasses 1. An axis AxR is an optical axis of the magnifying glass 10a for the right eye and an axis AxL is an optical axis of the magnifying glass 10b for the left eye.

As shown in FIG. 3, each of the magnifying glasses 10a and 10b has a magnifying optical system to examine an object in a magnified manner, and a deflector which deflects an optical path of the magnifying optical system. For example, the magnifying glass 10a for the right eye includes an objective lens 11a having a positive power, a prism 12a which deflects light incident from an objective side, and an eyepiece 13a having a negative power, which are arranged in that order from the object side.

Light passed through the objective lens 11a is reflected two times by inner surfaces of the prism 12a, and thereafter passes through the eyepiece 13a to be incident on the right eye ER. The objective lens 11a and the eyepiece 13a constitute a Galilean telescope. Hereafter, an angle formed between an optical axis of the eyepiece 13a and an optical axis of the objective lens 11a is defined as an deflection angle $\theta$. That is, the deflection angle $\theta$ is an angle formed between an optical axis extending from the objective lens 11a toward the prism 12a (i.e., the deflector) and an optical axis extending from the eyepiece 13a toward the prism 12a. In an example of the configuration of the magnifying glass 10a shown in FIG. 3, the deflection angle $\theta$ is set to be 45°.

As shown in FIG. 3, a hole 2a is formed on the eyeglass 1a at a portion corresponding to the optical path in the magnifying glass 10a. The objective lens 11a, the prism 12a and the eyepiece 13a are attached to the lens 1a by a supporting member (not shown). The magnifying glass 10b is configured in a similar fashion and is attached to the lens 1b by a supporting member (not shown).

Figure 4:
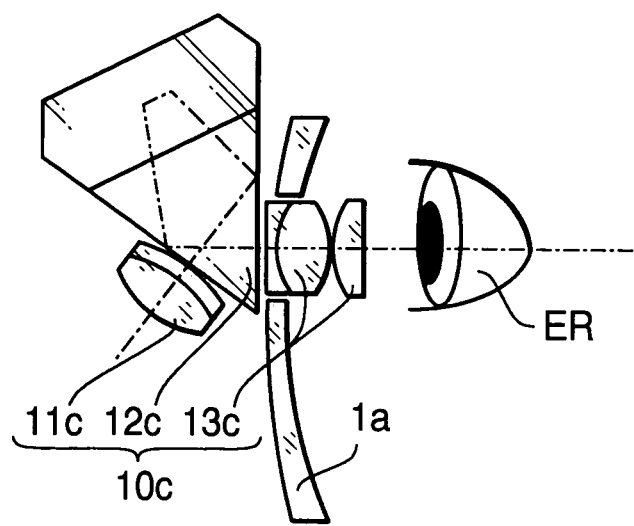
FIG. 4 shows an example of a magnifying glass configured to be a Keplerian telescope.
Figure 5:
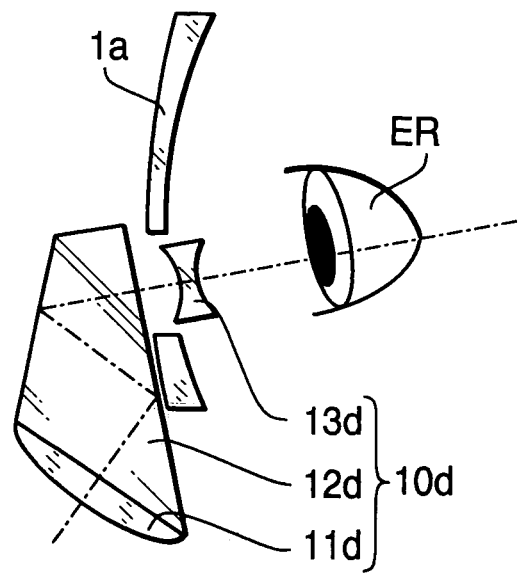
FIG. 5 shows an example of a magnifying glass configured to be a Galilean telescope.

FIGS. 4 and 5 show other examples of the magnifying glass 10a (10b). FIG. 4 shows a configuration of a magnifying glass 10c which includes an objective lens 11c having a positive power, a roof prism 12c, and an eyepiece 13c having a positive power. The objective lens 11c and the eyepiece 13c constitute a Keplerian telescope. The roof prism 12c reverses laterally and vertically an image.

FIG. 5 shows a configuration of a magnifying glass 10d which includes an objective lens 11d having a positive power, a prism 12d, and an eyepiece 13d having a negative power. The objective lens 11d and the eyepiece 13d constitute a Galilean telescope. In both of the examples shown in FIGS. 4 and 5, the deflection angle θ is 45°.

The adjustment method (i.e., a method of adjusting convergence of the binocular magnifying glasses 10) according to the first embodiment will be described in detail. FIG. 6 schematically shows definitions of adjustment axes used for explaining the adjustment method. As shown in FIG. 6, $X_L$ and $X_R$ respectively correspond to visual exes of the left and right eyes when the object distance is infinite in a condition of a primary position (defined in the Japanese Industrial Standards(JIS): T7330/5.31). The visual axis $X_L$, passing through a center of rotation $C_L$ of the left eye $E_L$, and the visual axis $X_R$, passing through a center of rotation $C_R$ of the right eye ER, are parallel with each other. The primary position refers to a position of eye relative to a head when a person views an object located forward the front of the person at a height of his or her head.

An axis perpendicular to both of the axis $X_L$ and the axis $X_R$ is defined as a Z-axis. The Z-axis is parallel with a line passing through the center of rotation $C_L$ and the center of rotation $C_R$. An axis perpendicular to the axis $X_L$ and the Z-axis is defined as an axis $Y_L$, and an axis perpendicular to the axis $X_R$ and the Z-axis is defined as an axis $Y_R$.

Rotation of the magnifying glass 10a about the axis $X_R$ and rotation of the magnifying glass 10b about the axis $X_L$ are referred to as a γ-rotation. Rotation of the magnifying glass 10a about the axis $Y_R$ and rotation of the magnifying glass 10b about the axis $Y_L$ are defined as a β-rotation. As shown in FIGS. 1 and 6, in a situation where the binocular magnifying glasses 10 are viewed from the object side, an angle of the γ-rotation has a positive sign when the magnifying glass 10a or 10b is rotated clockwise and has a negative sign when the magnifying glass 10a or 10b is rotated counterclockwise.

As shown in FIGS. 2 and 6, in a situation where the binocular magnifying glasses 10 are viewed from the top side, an angle of the β-rotation has a positive sign when the magnifying glass 10a or 10b is rotated clockwise and has a negative sign when the magnifying glass 10a or 10b is rotated counterclockwise.

As described in detail below, the adjustment of the convergence is performed by respectively rotating the magnifying glass 10a and the magnifying glass 10b (by ±γ°) in directions opposite to each other using the γ-rotation (see arrows shown in FIG. 1). An inclination of the image caused by the γ-rotation can be corrected by respectively rotating the magnifying glass 10a and the magnifying glass 10b (by ±γ°) in directions opposite to each other using the β-rotation (see arrows shown in FIG. 2).

As described in detail below, the inclination of the image caused by the γ-rotation is canceled by the inclination of the image caused by the β-rotation while a condition, in which the adjustment of convergence is accomplished, is maintained.

Given that the amount of inclination of the image caused by the γ-rotation and the amount of inclination of the image caused by the β-rotation with respect to a condition in which the object distance is infinite (i.e., a condition where the angle of convergence is 0° and no inclination of the image occurs) is represented by ε(γ) and ε(β), respectively. The correction of inclination of the image can be accomplished when the sum of ε(γ) and ε(β) is within a certain allowable range. The ε(γ) and ε(β) are expressed by the following equations, respectively.

$$\epsilon(\gamma) = \gamma - \cos^{-1}\{1 - \sin^2(90 - \theta) \times (1 - \cos \gamma)\} \quad (1\text{-}1)$$

$$\epsilon(\beta) = \cos^{-1}\{1 - \sin^2 \theta \times (1 - \cos \beta)\} \quad (1\text{-}2)$$

FIG. 7 is a graph showing the amount of inclination of the image ε(γ) with respect to the deflection angle θ when the adjustment of convergence is accomplished only by the γ-rotation, and the amount of rotation of the image ε(β) with respect to the deflection angle θ when the adjustment of the convergence is accomplished only by the β-rotation, assuming that the object distance WD=500 mm, an interpupillary distance P=64 mm, and a magnification (angular magnification) m=2.5. Also, in FIG. 7, the amount of rotation γ required to accomplish the adjustment of convergence only by the γ-rotation, and the amount of rotation β required to accomplish the adjustment of convergence only by the β-rotation are indicated with respect to the deflection angle θ.

As show in FIG. 7, the ε(γ) takes values larger than or equal to 0.5° when the deflection angle is larger than 15° (θ>15°) in the adjustment by the γ-rotation. Also, the ε(β) takes values larger than or equal to 0.5° when the deflection angle is larger than 5° (θ>5°) in the adjustment by the β-rotation. When the ε(γ) and ε(β) take values larger than or equal to 0.5°, a relative amount of inclination between the right and left images becomes larger than 1.0° because each of the ε(γ) and ε(β) is a value that one of the magnifying glass 10a and the magnifying glass 10b takes, and the other magnifying glass is rotated inversely in one of the γ-rotation and the β-rotation.

When the relative amount of inclination between the right and left images becomes larger than 1.0°, it becomes difficult for the wearer to match the right image with the left image. Even if the wearer's eyes can match the right image to the left image, such adjustment puts an enormous load on the wearer's eyes and thereby the wearer suffers from fatigue. Accordingly, it is required to avoid the adjustment of convergence by only one of the γ-rotation and the β-rotation when the deflection angles θ is larger than 15°.

It is understood from FIG. 7 that when the adjustment of convergence is performed by one of the γ-rotation and the β-rotation, a relationship ε(γ)<ε(β) holds. More specifically, when the interpupillary distance P=64 mm and the deflection angle θ=45°, ε(γ) is 1.5° and ε(β) is 6.1° and therefore a relationship ε(γ)≅ε(β)/4 holds. That is, when the effects of the adjustments of convergence are equal to each other between the adjustment by the γ-rotation and the adjustment by the β-rotation, the amounts of inclination by γ-rotation and by the β-rotation are different from each other.

Accordingly, by adjusting the convergence principally using the γ-rotation, and then correcting the inclination of the image caused by the γ-rotation using the β-rotation, it becomes possible to appropriately perform the adjustment of convergence without causing the inclination of the image.

That is, the adjustment method according to the first embodiment of the invention includes adjusting the convergence principally using the γ-rotation, and correcting the inclination of the image caused by the γ-rotation using the β-rotation.

When the relationship ϵ(γ)+ϵ(β)=0 is satisfied, the inclination of the image can be corrected completely. However, by considering positional errors of optical components in the binocular magnifying glasses 10 and a fact that the complete correction of the inclination of the image is not necessarily required since the wearer has a certain amplitude of accommodation, the adjustment method according to the first embodiment may be performed to satisfy the following condition (1).

$$-0.50° < \epsilon(\gamma)+\epsilon(\beta) < 0.50° \quad (1)$$

When the adjustment method according to the first embodiment is performed under the condition (1), it is possible to match the right image to the left image, reducing the relative amount of inclination of the image to a value smaller than 1°. By contrast, when the condition (1) is not satisfied, it becomes difficult for the wearer to match the right image to the left image.

Alternative to the condition (1), the adjustment method according to the first embodiment may be performed to satisfy the following condition (2) according to the Japanese Industrial Standards (JIS) regarding binoculars.

$$-0.33° < \epsilon(\gamma)+\epsilon(\beta) < 0.33° \quad (2)$$

In the conditions (1) and (2), a case of ϵ(γ)+ϵ(β)=0 is excluded because it corresponds to a situation where the object distance is infinite (i.e., no adjustment is required). The binocular magnifying glasses 10 are targeted for the observation of the object typically located at the object distance raging from 20 cm through 100 cm. Therefore, there is no necessity to consider use of the binocular magnifying glasses 10 at the infinite object distance (i.e., γ=0). For this reason, a case of ϵ(γ)+ϵ(β)=0 is excluded.

FIG. 8 is a graph showing an appropriate range of the adjustment with regard to the angle γ of the γ-rotation and the angle β of the β-rotation when the magnification m=2.5, the object distance WD=500 mm, and the deflection angle θ=30°. Similarly, FIG. 9 is a graph showing an appropriate range of the adjustment with regard to the angle γ of the γ-rotation and the angle β of the β-rotation when the magnification m=2.5, the object distance WD=500 mm, and the deflection angle θ=45°. FIG. 10 is a graph showing an appropriate range of the adjustment with regard to the angle γ of the γ-rotation and the angle β of the β-rotation when the magnification m=2.5, the object distance WD=500 mm, and the deflection angle θ=60°.

In each of FIGS. 8–10, an upper heavy line 81 and a lower heavy line 82 correspond to the lower limit (i.e., −0.50°) and the upper limit (i.e., 0.50°) of the condition (1), respectively. Further, an upper thin line 83 and a lower thin line 84 correspond to the lower limit (i.e., −0.33°) and the upper limit (i.e., 0.33°) of the condition (2), respectively. Further, a chain line indicates the case of ϵ(γ)+ϵ(β)=0.

Appropriate values of the angles γ and β change depending on the interpupillary distance. In each of FIGS. 8–10, three cases of the interpupillary distances (P) of 55 mm, 60 mm and 65 mm are indicated by lines. A range lying between the upper and the lower heavy lines along each of the lines indicating the cases of interpupillary distances (P) of 55 mm, 60 mm and 65 mm corresponds to an appropriate adjustment range of the angles γ and β satisfying the condition (1). Also, a range lying between the upper and the lower thin lines along each of the lines indicating the cases of interpupillary distances of 55 mm, 60 mm and 65 mm corresponds to an appropriate adjustment range of the angles γ and β satisfying the condition (2).

For example, in the case of the interpupillary distance of 60 mm in FIG. 8, the angle γ can be changed within the range of 8.1°<γ<10.8°, and the angle γ is determined from the range of −3.8°<β<−1.8° in accordance with the value of the angle γ to satisfy the condition (1). Further, in the case of the interpupillary distance of 60 mm in FIG. 8, the angles γ and β are required to be 9.4° and −2.5°, respectively, to completely correct the inclination of the image.

Next, another condition to enable adjusting the convergence without putting a load on the wearer's eyes will be explained. The following explanation is made in consideration of a fact that there is a relationship between convergence and accommodation of eyes.

When a distance between the optical axis of the objective lens of the magnifying glass 10a and the optical axis of the objective lens of the magnifying glass 10b is represented by P0 [mm], if the object distance is infinite, the angle of convergence is 0° and a distance between the optical axis AxL and the optical axis AxR of the left and right magnifying glasses 10a and 10b on an object plane is also represented by P0 [mm].

On the other hand, when the object distance takes a finite value WD, the optical axis AxL and AxR are required to intersect with each other on the object plane. Therefore, when the object distance takes a finite value WD, each magnifying glass (10a, 10b) has to move its optical axis (AxL, AxR) by P0/2 [mm] on the object plane.

That is, when the amount of movement of each optical axis (AxL, AxR) on the object plane caused by the γ-rotation with respect to the condition of the infinite object distance is represented by Zγ and the amount of movement of each optical axis (AxL, AxR) on the object plane caused by the β-rotation with respect to the condition of the infinite object distance is represented by Zβ, if a relationship Zγ+Zβ=P0/2 holds, the adjustment of convergence is accomplished.

It is noted that when the optical axis (AxL, AxR) does not shift in the z-axis direction, the distance P0 is equal to the interpupillary distance P of the wearer (the binocular magnifying glasses 10 shown in FIG. 3 is configured such that the optical axis of each magnifying glass does not shift in the z-axis direction). For this reason, the distance P0 is replaced with the in interpupillary distance P in the following explanation. If the binocular magnifying glasses is configured such that the optical axis of each magnifying glass can shift in the z-axis direction, additional considerations may be added to the following explanations.

The amounts of movement Zγ and Zβ are expressed by the following equations using the object distance WD, the deflection angle θ, the magnification m and the angles of rotation γ and β.

$$Z\gamma = WD \times \sin\theta \times \tan\gamma$$

$$Z\beta = WD \times \cos\theta \times \tan(\beta-\beta/m)$$

Meanwhile, when the wearer views the object having the finite object distance, the eyes of the wearer rotate in inward directions. In this case (i.e., when the angle of convergence is not 0°), an actual interpupillary distance P changes. Therefore, an additional consideration concerning the change of the interpupillary distance P caused by the rotations of eyes have to be made with regard to the relationship Zγ+Zβ=P0/2.

In this embodiment, a correction value ΔP for correcting the amount of (Zγ+Zβ) is defined by the following equation, considering the change of the interpupillary distance P caused by the rotations of eyes.

$$\Delta P = 2[WD \times \cos\theta \times \tan(\beta(Z)/m) + ED \times \tan\beta(Z)]$$

In this equation, β(Z) represents the angle of rotation or ½ of the angle of convergence, ED represents a distance from the center of rotation CR (CL) to an optical surface in the magnifying optical system of the magnifying glass 10a (10b) farthest from the center of rotation $C_R$ (CL). It is noted that the magnifying glasses 10a and 10b are attached to the eyeglasses 1, the distance ED is represented by an approximate value of 25 mm (i.e., ED≅25 mm).

Accordingly, the above equation is changed to the following equation.

$$\Delta P = 2[WD \times \cos\theta \times \tan(\beta(Z)/m) + 25 \times \tan\beta(Z)]$$

FIG. 11 is a graph showing change of half the correction value ΔP with respect to the deflection angle θ, assuming that the magnification m=2.5 and the object distance WD=500 mm. In FIG. 11, a curve indicated by a heavy line represents a case of the angle of rotation β(Z)=1.8°, and a curve indicated by a thin line represents a case of the angle of rotation β(Z)=3.7°.

When a relationship Zγ+Zβ+ΔP/2=P0/2 holds, it becomes possible to adjust the convergence consistent with accommodation. By considering an amplitude of accommodation and positional errors of the optical components in the binocular magnifying glasses 10, the relationship Zγ+Zβ+ΔP/2=P0/2 allows an error of about ±10%. Therefore, the following relationship is derived.

$$0.45 < (Z\gamma + Z\beta + \Delta P/2) < 0.55$$

By further considering that the interpupillary distance P is represented by an average interpupillary distance of 64 mm, the above relationship can be changed to:

$$28.8 \text{ mm} < Z\gamma + Z\beta + \Delta P/2 < 35.2 \text{ mm} \quad (3).$$

The error of ±10% of the relationship (3) corresponds to excess and deficiency of ±3.2 mm with regard to the amount of movement of the optical axis (AxL, AxR) on the object plane. However, such excess and deficiency of ±3.2 mm can be adjusted by the rotations of eyes (i.e., the angles of rotation) of ±1.5° when the deflection angle is smaller than or equal to 60°. Therefore, such error of ±10% does not put an enormous load on the wearer's eyes.

The wearer's accommodation (diopter) in a relaxed state of eyes is −1∼−2D for a normal visual acuity (or for a corrected visual acuity), and therefore it is desirable that lines of sight of the right and left eyes coincide with each other at the distance corresponding to the diopter of −1∼−2D. When the diopter is within −1∼−2D, the angle of rotation β(Z) (i.e., half of the angle of convergence) takes a value raging from 1.8°∼3.7° in the case of P=64 mm.

By obtaining the value of ΔP assigning thus obtained value (1.8°∼3.7°) to β(Z), and then determining γ and β so that the relationship (3) is satisfied, it becomes possible to accomplish the adjustment of convergence without putting a load to the eyes.

The binocular magnifying glasses may be configured such that one of the right and left magnifying glasses 10a and 10b is brought near to the other by a certain distance of Z mm in the z-axis direction in accordance with a relationship Z=ED×tan β(Z) (where β(Z)≠0) so that vignetting is not caused.

Second Embodiment

Hereafter, a second embodiment according to the invention will be described.

FIGS. 12–14 show a configuration of binocular magnifying glasses 20 according to the second embodiment of the invention. FIG. 12 is a front view of the binocular magnifying glasses 20. FIG. 13 is a top view of the binocular magnifying glasses 20. FIG. 14 is a side view of the binocular magnifying glasses 20 showing a configuration of a magnifying glass 20a for the right eye (ER).

As show in FIGS. 12 and 13, the binocular magnifying glasses 20 have the magnifying glass 20a for the right eye (ER) attached to a lens 5a of eyeglasses 5, and a magnifying glass 20b for the left eye (EL) attached to a lens 5b of the eyeglasses 5. An axis AxR is an optical axis of the magnifying glass 20a for the right eye and an axis AxL is an optical axis of the magnifying glass 20b for the left eye.

Since the configuration of the binocular magnifying glasses 20 is similar to the configuration of binocular magnifying glasses 10 shown in FIGS. 1 and 2, in FIGS. 12 and 13 to elements which are similar to those in FIGS. 1 and 2, the same reference numbers are assigned, and the detailed description thereof will not be repeated.

Each of the magnifying glasses 20a and 20b has a magnifying optical system to examine an object in a magnified manner and a deflector which deflects an optical path of the magnifying optical system and reflects light incident thereon to make an erect image. For example, as shown in FIG. 14, the magnifying glass 20a for the right eye includes a objective lens 21a having a positive power, a roof prism 22a which deflects light incident from an objective side, and an eyepiece 23a having a positive power, which are arranged in that order from the object side.

Light passed through the objective lens 21a is reflected four times by inner surfaces of the roof prism 22a, and thereafter passes through the eyepiece 23a to be incident on the right eye ER. The objective lens 21a and the eyepiece 23a constitute a Keplerian telescope. Hereafter, an angle is defined as a deflection angle θ. In the example shown in FIG. 14, the deflection angle θ, formed between an optical axis of the eyepiece 23a and an optical axis of the objective lens 21a, is set to be 45°.

As shown in FIG. 14, a hole 3a is formed on the eyeglass 5a at a portion corresponding to the optical path of the magnifying glass 20a. The objective lens 21a, the roof prism 22a and the eyepiece 23a are attached to the lens 5a by a supporting member (not shown). The magnifying glass 20b is configured in a similar fashion and is attached to the lens 5b by a supporting member (not shown).

Next, a configuration of the roof prism 22a is described in detail with reference to FIGS. 15 and 16. FIG. 15 shows a conventional roof prism 40 which is now in widespread use in binoculars. FIG. 16 shows a configuration of the roof prism 22a according to the embodiment of the invention.

As shown in FIG. 15, the roof prism 40 has a first reflective surface S1 which reflects light incident thereon from the objective lens 21a, a second reflective surface S2, a third reflective surface S3, and a fourth reflective surface S4. The second reflective surface S2 and the third reflective surface S3 are perpendicular to each other and constitute a roof surface.

Light entering into the roof prism 40 through the fourth reflective surface S4 is reflected by the first reflective surface S1, and is reflected by the roof surface consisting of the second and third reflective surfaces S2 and S3. Then, the light reflected by the roof surface is reflected by the fourth reflective surface S4, and thereafter emerges from the roof prism 40 through the first reflective surface S1.

In FIG. 15, "L14" represents an intersection line of the first and fourth reflective surfaces S1 and S4. A plane FS is also defined in FIG. 15. The intersection line L14 is normal to the plane FS. The plane FS intersects with the intersection line L14 at a midpoint M14 of the intersection line L14. In this situation, the plane FS includes an intersection line L23 of the second reflective surface S2 and the third reflective surface S3.

As shown in FIG. 16, the roof prism 22a according to the embodiment has a first, second, third and fourth reflective surfaces S21, S22, S23 and S24. The reflective surfaces S22 and S23 constitute a roof surface. Similarly to the roof prism 40, light entering into the roof prism 22a through the fourth reflective surface S24 is reflected by the first reflective surface S21, and is reflected by the roof surface consisting of the reflective surfaces S22 and S23. Then, the light reflected by the roof surface is reflected by the fourth reflective surface S24, and thereafter emerges from the roof prism 22a through the first reflective surface S21.

Similarly to FIG. 15, "L24" represents an intersection line of the first and fourth reflective surfaces S21 and S24. The plane FS is also indicated in FIG. 16. That is, the intersection line L24 is normal to the plane FS. The plane FS intersects with the intersection line L24 at a midpoint M24 of the intersection line L24. In FIG. 16, "L33" represents an intersection line of the second reflective surface S22 and the third reflective surface S23.

In contrast to the fact that the plane FS includes the intersection line L23 in the configuration of the conventional roof prism 40 shown in FIG. 15, the intersection line L33 forms an angle $\psi$ [°] ($\psi \neq 0$) with respect to the plane FS in the roof prism 22a. By configuring the roof prism 22a to have the angle $\psi$ ($\psi \neq 0$) between the intersection line L33 and the plane FS, the roof prism 22a can attain the function of deflecting the optical axis in the magnifying glass 20a (20b), rotating the image by 180°, and correcting the inclination of the image during the adjustment of convergence.

The deflection angle $\theta$ can be changed, for example, within a range of about 30°~60°, by changing an angle formed between the first and fourth reflective surfaces S21 and S24 of the roof prism 22a.

Next, an adjusting method (i.e., a method of adjusting convergence of the binocular magnifying glasses 20) according to the second embodiment will be described. The definitions of adjustment axes defined with reference to FIG. 6 in the first embodiment are also applied to the second embodiment. Therefore, the explanation thereof is not repeated. In this embodiment, z-axis intersects the axis $X_L$ at a position at which the roof prism of the magnifying glass 20b is located, and intersects the axis $X_R$ at a position at which the roof prism 22a of the magnifying glass 20a is located.

Rotation of the magnifying glass 20a about the axis $X_R$ and rotation of the magnifying glass 20b about the axis $X_L$ are the $\gamma$-rotation. Rotation of the magnifying glass 20a about the axis $Y_R$ and rotation of the magnifying glass 20b about the axis $Y_L$ are the $\beta$-rotation (see FIGS. 12 and 13).

The method of adjusting convergence according to the embodiment includes rotating the magnifying glasses 20a and 20b by $\pm\beta°$ in directions opposite to each other using the $\beta$-rotation to match optical axes thereof to the visual axes of eyes, respectively, and rotating the magnifying glasses 20a and 20b by $\pm\gamma°$ in directions opposite to each other using the $\gamma$-rotation to adjust convergence. The inclination of the image is corrected by an adjustment of the angle $\psi$.

The inclination of the image occurs due to the $\gamma$-rotation and/or the $\epsilon$-rotation. As described above in the first embodiment, the $\epsilon(\gamma)$ and $\epsilon(\beta)$ are expressed by the following equations.

$$\epsilon(\gamma) = \gamma - \cos^{-1}\{1 - \sin^2(90-\theta) \times (1 - \cos\gamma)\} \quad (1\text{-}1)$$

$$\epsilon(\beta) = \cos^{-1}\{1 - \sin^2\theta \times (1 - \cos\gamma)\} \quad (1\text{-}2)$$

FIG. 17 is a graph showing the amount of inclination of the image $\epsilon(\gamma)$ with respect to the deflection angle $\theta$ when the adjustment of convergence is accomplished only by the $\gamma$-rotation in the binocular magnifying glasses 20, and the amount of inclination of the image $\epsilon(\beta)$ with respect to the deflection angle $\theta$ when the adjustment of convergence is accomplished only by the $\beta$-rotation in the binocular magnifying glasses 20, assuming that the object distance WD=500 mm, the interpupillary distance P=64 mm, and the magnification (angular magnification) m=2.5. Also, in FIG. 17, the amount of rotation $\gamma$ required to accomplish the adjustment of convergence only by the $\gamma$-rotation and the amount of rotation $\beta$ required to accomplish the adjustment of convergence only by the $\beta$-rotation are indicated with respect to the deflection angle $\theta$.

Similarly to FIG. 7 of the first embodiment, in FIG. 17, the $\epsilon(\gamma)$ and $\epsilon(\beta)$ take values larger than or equal to 0.5° when the deflection angle is larger than 15° ($\theta>15°$) in the adjustment by the $\gamma$-rotation and when the deflection angle is larger than 5° ($\theta>5°$) in the adjustment by the $\beta$-rotation. When the $\epsilon(\gamma)$ and $\epsilon(\beta)$ take values larger than or equal to 0.5°, the relative amount of inclination between the right and left images becomes larger than 1.0° because each of the $\epsilon(\gamma)$ and $\epsilon(\beta)$ is a value that one of the magnifying glass 20a and the magnifying glass 20b takes, and the other magnifying glass is rotated inversely in each of the $\gamma$-rotation and the $\beta$-rotation.

In such a case, it becomes difficult for the wearer to match the right image with the left image. Even if the wearer's eyes can match the right image to the left image, such adjustment puts an enormous load on the wearer's eyes and thereby the wearer suffers from fatigue.

For this reason, in this embodiment, the adjustment of the angle $\psi$ is performed to correct the inclination of the image. More specifically, the method of adjusting convergence according to the second embodiment is performed while the following condition (4) is satisfied.

$$-0.5° < 2\psi - \{\epsilon(\gamma) + \epsilon(\beta)\} < 0.5° \quad (4)$$

When the relationship $2\psi - \{\epsilon(\gamma) + \epsilon(\beta)\} = 0$ is satisfied, the inclination of the image can be corrected completely. However, similarly to the introduction of the condition (1) in the first embodiment, the upper and lower limits ($\pm 0.5$) of the condition (4) are determined by considering positional errors of optical components in the binocular magnifying glasses 20 and a fact that the complete correction of the inclination of the image is not necessarily required since the wearer has a certain amplitude of accommodation.

Alternative to satisfying the condition (4), in accordance with the JIS regarding prism binoculars, the method of adjusting convergence may be performed while the following condition is satisfied.

$$-0.33° < 2\psi - \{\epsilon(\gamma) + \epsilon(\beta)\} < 0.33°$$

Each of the upper and lower limits $\pm 0.33$ corresponds to half of an allowable amount 40' of the inclination of the image (i.e., an allowable amount of inclination between the right and left images) defined in the JIS regarding prism binoculars.

By performing the adjustment of convergence while the condition (4) is satisfied, it becomes possible to reduce the relative amount of inclination of the image to a value smaller than or equal to 1°, which enables the wearer to match the right image to the left image easily. By contrast, when the condition (4) is not satisfied, it becomes difficult to match the right image to the left image.

It is possible to cancel the inclination of the image caused by the γ-rotation using the inclination of the image caused by the β-rotation. However, to use the β-rotation to correct the inclination of the image caused by the γ-rotation makes it impossible to match the optical axes to the visual axes. If the β-rotation is used to correct the inclination of the image, lens axes of the magnifying optical system are not utilized to observe the object since as described above the optical axes shift from the visual axes. Therefore, use of the β-rotation for correcting the inclination of the image deteriorates quality of the image.

By contrast, since the method of adjusting the convergence according to the second embodiment uses the adjustment of the angle ψ, it becomes unnecessary to use the β-rotation to correct the inclination of the image caused by the γ-rotation, and therefore it becomes possible to correct the inclination of the image while the optical axes and the visual axes match with each other.

To attain more comfortable binocular vision, the angle β[°] of the β-rotation is required to satisfy the following condition (5):

$$0.9 \times |\xi| - 0.3 < 31.3 \times \tan \beta < 1.3 \times |\xi| + 1 \qquad (5)$$

where ξ represents diopter [D] of the magnifying optical system.

To enable binocular vision, it is required that a balanced point of accommodation and convergence of eyes lies within a certain range. FIG. 18 is a graph showing a relationship of the accommodation and the convergence made with reference to FIGS. 2–16 shown in a publication "Handbook Of Optics Of Spectacles", Kanehara Press, p 66. The binocular vision is possible when the balanced point of the accommodation and the convergence is included within a leaf-shaped region E indicated by a curve of relative accommodation and convergence (indicated by a heavy line). When the balanced point of accommodation and the convergence is included within a region F which is indicated by using a hatching and lies in a central portion of the region E, the comfortable binocular vision is possible. The region F has an area about ⅓ of the region E.

The region F lies in a range smaller than 5 [D] which does not cause strong fatigue to the wearer. When the condition (5) is satisfied, the balanced point of the accommodation and the convergence is included within the region F. That is, to satisfy the condition (5) enables to attain the comfortable binocular vision.

The diopter ξ of an optical system (which is substantially equal to the accommodation of eye) is defined with respect to a person of a normal vision. With regard to a person requiring correction, the diopter of an optical system is defined by defining corrected visual acuity as zero. In the condition (5), the interpupillary distance is regarded as an average value of 64 mm.

Next, an adjustment of interpupillary distance of the binocular magnifying glasses 20 will be explained. An appropriate value of the interpupillary distance differs from one person to another. Therefore, the adjustment of interpupillary distance of the binocular magnifying glasses 20 has to be performed in accordance with the interpupillary distance of each wearer. It is desirable to use the γ-rotation for the adjustment of interpupillary distance because the γ-rotation causes the inclination of the image of which amount is smaller than that of the β-rotation.

In the adjustment of interpupillary distance, firstly, the angles β, γ and ψ are adjusted so that the inclination of the image is not caused using the average interpupillary distance of 64 mm. Secondly, the adjustment of interpupillary distance is performed using the γ-rotation to meet the individual difference of the interpupillary distance (which is typically within ±6 mm).

The adjustment amount of convergence is expressed by the following equation (6).

$$Z\gamma = WD \times \sin\theta \times \tan\gamma \qquad (6)$$

The maximum amount of the inclination of the image caused as a result of the adjustment of interpupillary distance using the γ-rotation is determined by firstly assigning values of Zγ (=6 mm), WD and the deflection angle θ to the equation (6) to obtain the angle γ, and then assigning the obtained value of the angle γ to the equation (1-1). FIG. 19 is a graph showing the amount of inclination of the image caused the γ-rotation when the amount of the adjustment of interpupillary distance is 6 mm. In FIG. 19, the amount of inclination of the image is shown with respect to the object distance WD. In FIG. 19, three curves are indicated with regard to the deflection angles θ of 30°, 45° and 60°.

As can be seen from FIG. 19, the inclination of the image increases as the deflection angle increases. Also, the inclination of the image increases as the object distance WD decreases.

If the inclination of the image is corrected with respect to the average interpupillary distance (e.g., 64 mm) in advance of the adjustment of the interpupillary distance, the amount of inclination of the image is smaller than or equal to 0.3° when θ=60° and the WD is larger than or equal to about 500 mm, when θ=45° and the WD is larger than or equal to about 250 mm, and when θ=30° and the WD is larger than or equal to about 200 mm. When the amount of inclination of the image smaller than or equal to 0.3°, matching the right image to the left image can be smoothly accomplished.

At a stage of design of the roof prism 22a whose angle ψ is to be fixed, the angle ψ is determined so that the inclinations of the image of the γ-rotation and β-rotation cancel with each other, using a supposed use condition (e.g., the object distance WD, interpupillary distance P, magnification m, and deflection angle θ). It is noted that various use conditions of the binocular magnifying glasses 20 are supported by changing the angle ψ.

In an assembling process of the binocular magnifying glasses, various types of roof prisms having different angles ψ are fabricated previously, and then one of the various types of the roof prisms is selected in accordance with the angle ψ matching with a use condition and individual data of each wearer. More specifically, the angle ψ is determined so as to correct the inclination of the image determined by the adjustment angles of γ and β which are determined based on a use condition and individual data of each wearer.

Using thus selected roof prism, the magnifying glass 20a (20b) is assembled. Next, in a situation where the magnifying glasses 20a and 20b are attached to the eyeglasses 5, the adjustment using the γ-rotation and β-rotation is performed. Then, the position of each magnifying glass is fixed. By thus fixing the position of each magnifying glass, the wearer is not required to perform adjustment of the γ-rotation and β-rotation by himself or by herself.

FIG. 20 shows another example of the deflector, a roof prism 30, according to the embodiment of the invention. The roof prism 30 can be used in the magnifying glass 20a (20b) in place of the roof prism 22a. As shown in FIG. 20, the roof prism 30 is configured as a combination of prism blocks 31 and 32 cemented to each other. As in the case of the roof prism 22a, the roof prism 30 has a first reflective surface S41, a second reflective surface S42, a third reflective surface S43, and a fourth reflective surface S44. The prism block 31 has the first and fourth reflective surfaces S41 and S44. The prism block 32 has the second and third reflective surfaces S42 and S43.

With this configuration, it becomes possible to set the angle ψ to a desired value by firstly rotating the prism block 32 about an axis L1 relative to the prism block 31, and then cemented the prism block 32 to the prism block 31. The axis L1 intersects with an edge line E1 (an intersection line of the second and third reflective surfaces S42 and S43) at a point D at which the edge line E1 and an optical axis Lx intersect with each other. In addition, the axis L1 is perpendicular to a bottom surface SA of the prism lock 32.

After a value of the angle ψ is determined based on the use condition and individual data of each wearer, the prism block 32 and the prism block 32 are cemented to each other while the determined angle ψ is formed between the edge line E1 and the plane FS (not shown in FIG. 20). Since the axis L1 passes through the point D at which the edge line E1 and the optical axis Lx intersect with each other, even if the angle ψ is changed, the optical axis Lx does not shift.

By using the roof prism 30 as the deflector in the binocular magnifying glasses 20, the inclination of the image can also be corrected as in the case of the roof prism 22a. By using the roof prism 30 as the combination of the prism block 31 and the prism block 32, it becomes possible to provide various types of roof prisms having different angles ψ only by preparing two kinds of prism blocks (31 and 32). Accordingly, the roof prism 30 obviates the need for previously preparing various types of roof prisms having different angles ψ to meet the various use conditions.

Third Embodiment

FIG. 21 shows a configuration of a magnifying glass 50c according to a third embodiment of the invention. Similarly to the magnifying glass 20a (20b) of the second embodiment, the magnifying glass 50c can be attached to the eyeglass 5. That is, the magnifying glass 50c has substantially the same configuration as the magnifying glass 20a (20b) except for a mirror group 52c.

The definitions of adjustment axes defined with reference to FIG. 6 are also applied to the third embodiment.

As shown in FIG. 21, the magnifying glass 50c has a objective lens 51c having a positive power, the mirror group 52c which deflects light incident thereon from an objective side, and an eyepiece 53c having a positive power, which are arranged in that order from the object side.

Light passed through the objective lens 51 is reflected four times by the mirror group 52c, and thereafter passes through the eyepiece 53c to be incident on the right eye ER. In FIG. 21, the deflection angle θ, formed between an optical axis of the eyepiece 53c and an optical axis of the objective lens 51c, is set to be 45°.

FIG. 22 shows a configuration of the mirror group 52c. The mirror group 52c has a first mirror M1, a second mirror M2, a third mirror M3 and a fourth mirror M4. Light passed through the objective lens 51c is reflected by the first mirror M1, and then reflected by the second mirror M2. The light reflected by the second mirror M2 is reflected by the third mirror M3, and then reflected by the fourth mirror M4 to be incident the eyepiece 53c. The second and third mirror M2 and M3 are arranged to be orthogonal one another.

Similarly to the roof prism 21a of the second embodiment, the mirror group 52c is configured such that a plane perpendicular to an intersection line L14 of an extended planes of the first and fourth mirrors M1 and M4 forms the angle ψ (ψ≠0) with respect to an intersection line L23 along which an extended planes of the second and third mirrors M2 and M3 intersect with each other.

With this configuration, the mirror group 52c can provides the function of deflecting the optical axis Lx in the magnifying glass 50c, rotating the image by 180°, and correcting the inclination of the image during the adjustment of convergence.

A method of adjusting convergence according to the third embodiment is the same as the second embodiment, and explanations thereof will not be repeated. When the mirror group 52c is assembled, the second and third mirrors M2 and M3 are rotated with respect to the first and forth mirrors M1 and M4 to set the angle ψ to a desired value which is determined based on the use condition and the individual data of each wearer.

The binocular magnifying glasses according to the third embodiment attains the same advantageous as the second embodiment.

Although the present invention has been described in considerable detail with reference to certain preferred embodiments thereof, other embodiments are possible.

The present disclosure relates to the subject matters contained in Japanese Patent Applications No. P2003-081374, filed on Mar. 24, 2003, and No. P2003-201556, filed on Jul. 25, 2003, which are expressly incorporated herein by reference in their entireties.

What is claimed is:

1. Binocular magnifying glasses, comprising:
a pair of magnifying glasses for right and left eyes,
each of said pair of magnifying glasses comprising:
a magnifying optical system that has an objective lens with a positive power and an eyepiece with a positive power; and
a deflector that deflects an optical path of said magnifying optical system, said deflector located between said objective lens and said eyepiece,
wherein said deflector includes a first, second, third and fourth reflective surfaces, light incident on said deflector from said objective lens being reflected by said first, second, third and fourth reflective surfaces in order of said first, second, third and fourth reflective surfaces to direct the incident light to said eyepiece and to form an erect image,
wherein when an angle, formed between an intersection line of said second and third reflective surfaces and a plane with which an intersection line of said first and fourth reflective surfaces perpendicularly intersects, is represented by an angle ψ which does not take a value of zero, and where γ-rotation is about each of axes $X_L$ and $X_R$, which respectively correspond to visual axes of left and right eyes when an object distance is infinite in a condition of a primary position, and β-rotation is rotation about each of axis $Y_L$ and $Y_R$, which are respectively perpendicular to the axes $X_L$ and $X_R$ and are also perpendicular to a z-axis which perpendicularly intersects with the axis $X_L$ at a position of said deflector for the left eye and with the axis $X_R$ at a position of said deflector for the right eye, if an angle of the γ-rotation and an angle of the β-rotation are respectively represented by γ(°) and β(°) with respect to a condition in which optical axes of said objective lenses for the right and left eyes are parallel with each other, said binocular magnifying glasses satisfies a relationship:

$$-0.5° < 2\psi - \{\epsilon(\gamma) + \epsilon(\beta)\} < 0.5°$$

where $\epsilon(\gamma) = \gamma - \cos^{-1}\{1 - \sin^2(90-\theta) \times (1 - \cos \gamma)\}$,
$\epsilon(\beta) = \cos^{-1}\{1 - \sin^2 \theta \times (1 - \cos \beta)\}$, and
θ represents a deflection angle (unit: degree) that said deflector deflects the optical path.

2. The binocular magnifying glasses according to claim 1, wherein the angle β of the β-rotation satisfies a relationship:

$$0.9 \times |\xi| - 0.3 < |31.3 \times \tan \beta| < 1.3 \times |\xi| + 1$$

where ξ represents diopter (D) of said magnifying optical system.

3. The binocular magnifying glasses according to claim 1, wherein said deflector has a first deflecting part in which said first and fourth reflective surfaces are integrally provided, and a second deflecting part in which said second and third reflective surfaces are integrally provided,
wherein the angle ψ is formed by rotating the first deflecting part relative to the second deflecting part.

4. The binocular magnifying glasses according to claim 1, wherein said first, second, third and fourth reflective surfaces are mirrors, respectively.

5. The binocular magnifying glasses according to claim 1, wherein said deflector includes a prism having inner surfaces respectively functioning as said first, second, third and fourth reflective surfaces.

6. The binocular magnifying glasses according to claim 5, wherein the prism is configured as a roof prism with said second and third reflective surfaces comprising a roof surface of the roof prism.

7. An adjustment method for binocular magnifying glasses having a pair of magnifying glasses for right and left eyes, each of the pair of magnifying glasses having a magnifying optical system and a deflector deflecting an optical path of the magnifying optical system, the magnifying optical system including an objective lens with a positive power and an eyepiece with a positive power, the deflector being located between the objective lens and the eyepiece,
the deflector including a first, second, third and fourth reflective surfaces, light incident on said deflector from said objective lens being reflected by the first, second, third and fourth reflective surfaces in order of the first, second, third and fourth reflective surfaces to direct the incident light to the eyepiece and to form an erect image,
where an angle, formed between an intersection line of the second and third reflective surfaces and a plane with which an intersection line of the first and fourth reflective surfaces perpendicularly intersects, is represented by an angle ψ which does not take a value of zero, where γ-rotation is rotation about each of axes $X_L$ and $X_R$, which respectively correspond to visual axes of left and right eyes when an object distance is infinite in a condition of a primary position, and β-rotation is rotation about each of axis $Y_L$ and $Y_R$, which are respectively perpendicular to the axes $X_L$ and $X_R$ and are also perpendicular to a z-axis which perpendicularly intersects with the axis $X_L$ at a position of said deflector for the left eye and the axis $X_R$ at a position of said deflector for the right eye, and where an angle of the γ-rotation and an angle of the β-rotation are respectively represented by γ(°) and β(°) with respect to a condition in which optical axes of the objective lenses for the right and left eyes are parallel with each other, the adjustment method comprising:
rotating the pair of magnifying glasses in directions opposite to each other using the β-rotation to match optical axes thereof to visual axes of the eyes;
rotating the pair of magnifying glasses in directions opposite to each other using γ-rotation to adjust convergence; and
correcting inclination of an image by determining the angle ψ,
wherein the following relationship is satisfied:

$$-0.5° < 2\psi - \{\epsilon(\gamma) + \epsilon(\beta)\} < 0.5°$$

where $\epsilon(\gamma) = \gamma - \cos^{-1}\{1 - \sin^2(90-\theta) \times (1 - \cos \gamma)\}$,
$\epsilon(\beta) = \cos^{-1}\{1 - \sin^2 \theta \times (1 - \cos \beta)\}$, and
θ represents a deflection angle (unit: degree) that the deflector deflects the optical path.

8. The adjustment method according to claim 7, wherein the angle β of the β-rotation satisfies the following relationship:

$$0.9 \times |\xi| - 0.3 < |31.3 \times \tan \beta| < 1.3 \times |\xi| + 1$$

where ξ represents diopter (D) of the magnifying optical system.

9. The adjustment method according to claim 7, wherein the deflector has a first deflecting part in which the first and fourth reflective surfaces are integrally provided, and a second deflecting part in which the second and third reflective surfaces are integrally provided,
wherein the angle ψ is formed by rotating the first deflecting part relative to the second deflecting part before the first and second deflecting parts are secured to each other.

10. The adjustment method according to claim 7, wherein the first, second, third and fourth reflective surfaces are mirrors, respectively.

11. The adjustment method according to claim 7, wherein the deflector includes a prism having inner surfaces respectively functioning as the first, second, third and fourth reflective surfaces.

12. The adjustment method according to claim 11, wherein the prism is configured as a roof prism, the second and third reflective surfaces comprising the roof surface of the roof prism.

13. An adjustment method for binocular magnifying glasses having a pair of magnifying glasses for right and left eyes, each of the pair of magnifying glasses having a magnifying optical system and a deflector deflecting an optical path of the magnifying optical system, the adjustment method comprising:
rotating the pair of magnifying glasses in directions opposite to each other using γ-rotation; and
correcting inclination of an image, caused by the γ-rotation, by rotating the pair of magnifying glasses in directions opposite to each other using β-rotation,
where γ-rotation is rotation about each of axes $X_L$ and $X_R$, which respectively correspond to visual axes of the left and right eyes when an object distance is infinite in a condition of a primary position, and where β-rotation is rotation about each of axis $Y_L$ and $Y_R$, which are respectively perpendicular to the axes $X_L$ and $X_R$ and are also perpendicular to a z-axis which perpendicularly intersects with the axis $X_L$ at a position of the deflector for the left eye and the axis $X_R$ at a position of the deflector for the right eye, wherein, when an angle of the γ-rotation for each of the right and left eyes is represented by γ°, and an angle of the β-rotation for each of the right and left eyes is represented by β°, and wherein the following relationship is satisfied:

$$-0.50° < \epsilon(\gamma)+\epsilon(\beta) < 0.50°$$

where $\epsilon(\gamma)=\gamma-\cos^{-1}\{1-\sin^2(90-\theta)\times(1-\cos\gamma)\}$,
$\epsilon(\beta)=\cos^{-1}\{1-\sin^2\theta\times(1-\cos\beta)\}$, and
θ is a deflection angle (unit: degree) that the deflector deflects the optical path, except in a case where $\epsilon(\gamma)=\epsilon(\beta)=0$.

14. An adjustment method for binocular magnifying glasses having a pair of magnifying glasses for right and left eyes, each of the pair of magnifying glasses having a magnifying optical system and a deflector deflecting an optical path of the magnifying optical system, the adjustment method comprising:

rotating the pair of magnifying glasses in directions opposite to each other using γ-rotation; and correcting inclination of an image, caused by the γ-rotation, by rotating the pair of magnifying glasses in directions opposite to each other using β-rotation, where γ-rotation is rotation about each of axes $X_L$ and $X_R$, which respectively correspond to visual axes of the left and right eyes when an object distance is infinite in a condition of a primary position, and where β-rotation is rotation about each of axis $Y_L$ and $Y_R$, which are respectively perpendicular to the axes $X_L$ and $X_R$ and are also perpendicular to a z-axis which perpendicularly intersects with the axis $X_L$ at a position of the deflector for the left eye and the axis $X_R$ at a position of the deflector for the right eye, wherein, when an angle of the γ-rotation for each of the right and left eyes is represented by γ°, and an angle of the β-rotation for each of the right and left eyes is represented by β°, the following relationship is satisfied:

$$-0.33° < \epsilon(\gamma)+\epsilon(\beta) < 0.33°$$

where $\epsilon(\gamma)=\gamma-\cos^{-1}\{1-\sin^2(90-\theta)\times(1-\cos\gamma)\}$,
$\epsilon(\beta)=\cos^{-1}\{1-\sin^2\theta\times(1-\cos\beta)\}$, and
θ is a deflection angle (unit: degree) that the deflector deflects the optical path, except in a case where $\epsilon(\gamma)=\epsilon(\beta)=0$.

15. An adjustment method for binocular magnifying glasses having a pair of magnifying glasses for right and left eyes, each of the pair of magnifying glasses having a magnifying optical system and a deflector deflecting an optical path of the magnifying optical system, the adjustment method comprising:

rotating the pair of magnifying glasses in directions opposite to each other using γ-rotation; and correcting inclination of an image, caused by the γ-rotation, by rotating the pair of magnifying glasses in directions opposite to each other using β-rotation, where γ-rotation is rotation about each of axes $X_L$ and $X_R$, which respectively correspond to visual axes of the left and right eyes when an object distance is infinite in a condition of a primary position, and where β-rotation is rotation about each of axis $Y_L$ and $Y_R$, which are respectively perpendicular to the axes $X_L$ and $X_R$ and are also perpendicular to a z-axis which perpendicularly intersects with the axis $X_L$ at a position of the deflector for the left eye and the axis $X_R$ at a position of the deflector for the right eye, wherein, when an angle of the γ-rotation for each of the right and left eyes is represented by γ°, and an angle of the β-rotation for each of the right and left eyes is represented by β°, the following relationship is satisfied:

$$28.8 \text{ mm} < Z\gamma+Z\beta+\Delta P/2 < 35.2 \text{ mm}$$

where $Z\gamma = WD \times \sin\theta \times \tan\gamma$,
$Z\beta = WD \times \cos\theta \times \tan(\beta-\beta/m)$,
$\Delta P = 2\{WD \times \cos\theta \times \tan(\beta(Z)/m) + 25 \times \tan\beta(Z)\}$,
WD represents an object distance (mm),
m represents an magnification of each magnifying glass, and
β(Z) represents ½ of an angle of convergence.

16. Binocular magnifying glasses comprising:

a pair of magnifying glasses, one for each of a right and a left eye, each of said pair of magnifying glasses comprising:

a magnifying optical system; and a deflector that deflects an optical path of said magnifying optical system, wherein the binocular magnifying glasses are configured for adjustment by:

rotating the pair of magnifying glasses in directions opposite to each other using γ-rotation; and correcting inclination of an image, caused by the γ-rotation, by rotating the pair of magnifying glasses in directions opposite to each other using β-rotation, where γ-rotation is rotation about each of axes $X_L$ and $X_R$, which respectively correspond to visual axes of the left and right eyes when an object distance is infinite in a condition of a primary position, and β-rotation is rotation about each of axis $Y_L$ and $Y_R$, which are respectively perpendicular to the axes $X_L$ and $X_R$ and are also perpendicular to a z-axis which perpendicularly intersects with the axis $X_L$ at a position of the deflector for the left eye and with the axis $X_R$ at a position of the deflector for the right eye, wherein, when an angle of the γ-rotation for each of the right and left eyes is represented by γ°, and an angle of the β-rotation for each of the right and left eyes is represented by β°, the following relationship is satisfied:

$$-0.50° < \epsilon(\gamma)+\epsilon(\beta) < 0.50°$$

where $\epsilon(\gamma)=\gamma-\cos^{-1}\{1-\sin^2(90-\theta)\times(1-\cos\gamma)\}$,
$\epsilon(\beta)=\cos^{-1}\{1-\sin^2\theta\times(1-\cos\beta)\}$, and
θ is a deflection angle (unit: degree) that the deflector deflects the optical path, except in a case where $\epsilon(\gamma)=\epsilon(\beta)=0$.

17. Binocular magnifying glasses comprising:

a pair of magnifying glasses, one for each of a right and a left eye, each of said pair of magnifying glasses comprising:

a magnifying optical system; and a deflector that deflects an optical path of said magnifying optical system, wherein the binocular magnifying glasses are configured for adjustment by:

rotating the pair of magnifying glasses in directions opposite to each other using γ-rotation; and correcting inclination of an image, caused by the γ-rotation, by rotating the pair of magnifying glasses in directions opposite to each other using β-rotation, where γ-rotation is rotation about each of axes $X_L$ and $X_R$, which respectively correspond to visual axes of the left and right eyes when an object distance is infinite in a condition of a primary position, and β-rotation is rotation about each of axis $Y_L$ and $Y_R$, which are respectively perpendicular to the axes $X_L$ and $X_R$ and are also perpendicular to a z-axis which perpendicularly intersects with the axis $X_L$ at a position of the deflector for the left eye and with the axis $X_R$ at a position of the deflector for the right eye, wherein, when an angle of the γ-rotation for each of the right and left eyes is represented by γ°, and an angle of the β-rotation for each of the right and left eyes is represented by β°, the following relationship is satisfied:

$$-0.33° < \epsilon(\gamma) + \epsilon(\beta) < 0.33°$$

where $\epsilon(\gamma) = \gamma - \cos^{-1}\{1 - \sin^2(90-\theta) \times (1 - \cos \gamma)\}$,
$\epsilon(\beta) = \cos^{-1}\{1 - \sin^2 \theta \times (1 - \cos \beta)\}$, and
θ is a deflection angle (unit: degree) that the deflector deflects the optical path, except in a case where $\epsilon(\gamma) = \epsilon(\beta) = 0$.

18. Binocular magnifying glasses comprising:
a pair of magnifying glasses, one for each of a right and a left eye,
each of said pair of magnifying glasses comprising:
a magnifying optical system; and
a deflector that deflects an optical path of said magnifying optical system,
wherein the binocular magnifying glasses are configured for adjustment by:
rotating the pair of magnifying glasses in directions opposite to each other using γ-rotation; and
correcting inclination of an image, caused by the γ-rotation, by rotating the pair of magnifying glasses in directions opposite to each other using β-rotation,
where γ-rotation is rotation about each of axes $X_L$ and $X_R$, which respectively correspond to visual axes of the left and right eyes when an object distance is infinite in a condition of a primary position, and β-rotation is rotation about each of axis $Y_L$ and $Y_R$, which are respectively perpendicular to the axes $X_L$ and $X_R$ and are also perpendicular to a z-axis which perpendicularly intersects with the axis $X_L$ at a position of the deflector for the left eye and with the axis $X_R$ at a position of the deflector for the right eye, wherein when an angle of the γ-rotation for each of the right and left eyes is represented by γ°, and an angle of the β-rotation for each of the right and left eyes is represented by β°, the following relationship is satisfied:

$$28.8 \text{ mm} < Z\gamma + Z\beta + \Delta P/2 < 35.2 \text{ mm}$$

where $Z\gamma = WD \times \sin \theta \times \tan \gamma$,
$Z\beta = WD \times \cos \theta \times \tan(\beta - \beta/m)$,
$\Delta P = 2\{WD \times \cos \theta \times \tan(\beta(Z)/m) + 25 \times \tan \beta(Z)\}$,
WD represents an object distance (mm),
m represents an magnification of each magnifying glass, and
β(Z) represents ½ of an angle of convergence.

* * * * *